United States Patent Office 3,325,474
Patented June 13, 1967

3,325,474
ANTI-INFLAMMATORY STEROID 2′-ACETAMIDO-2′-DEOXY-GLUCOSIDE COMPOUNDS
Lewis H. Sarett, Princeton, Robert G. Strachan, Summit, and Ralph F. Hirschmann, Scotch Plains, N.J., assignors to Merck & Co., Inc., Rahway, N.J., a corporation of New Jersey
No Drawing. Filed Oct. 6, 1964, Ser. No. 402,015
12 Claims. (Cl. 260—210.5)

This application is a continuation-in-part of our co-pending application Ser. No. 259,384, filed Feb. 18, 1963, and now abandoned.

This invention is concerned generally with novel derivatives of hydroxylated anti-inflammatory compounds such as steroids of the pregnane series. More particularly, it is concerned with anti-inflammatory N-acylamido-2′-deoxy-glucosides and the 4′-epimers thereof, namely N-acyl-amido-2′-deoxy-galactosides formed from hydroxylated compounds having cortisone-like activity. It is especially concerned with N-acylamido - 2′ - deoxy - glucoside and galactoside derivatives of ring A unsaturated 11,17-bis-oxygenated-20-keto steroids of the anti-inflammatory pregnane series. In other aspects, the invention is concerned with processes by which the novel compounds may be prepared and with pharmaceutical compositions containing them. The compounds of this invention, especially ring A unsaturated steroid derivatives including the preferred 21-hydoxy derivatives, possess the anti-inflammatory activity characteristic of cortisone, hydrocortisone, and their Δ¹-derivatives, prednisone and prednisolone. The steroid derivatives are remarkably free from the ulcerogenic action, adrenal atrophy, thymus involution and body weight loss side-effects which have resulted from prolonged administration of the aforementioned anti-inflammatory steroids. The compounds of the invention are especially interesting because of their delayed absorption with resulting prolonged effect on oral administration.

Novel 21-yl compounds which are the preferred compounds within the scope of this invention may be represented by the formulas:

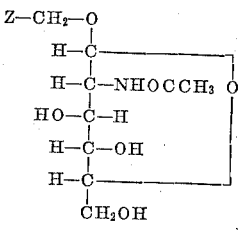  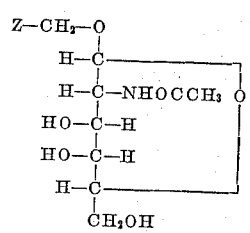

wherein Z—CH₂— is a radical of a ring A unsaturated 11,17-bis-oxygenated-20-keto-21-hydroxy steroid of the pregnane series formed by removal of the hydrogen of the hydroxyl group. Compounds represented by Formula I are glucoside derivatives and those represented by Formula II are galactoside derivatives. Novel 16-yl compounds may be similarly represented by replacing Z—CH₂— with a 16-hydroxy steroid radical in which the hydrogen atom of the hydroxyl group is replaced with the glucoside or galactoside moiety.

These preferred compounds may be prepared by reacting the selected 21-free alcohol with a 2-lower alkanoyl-amido compound such as 2-acetamido-3,4,6-tri-O-acyl-1-chloro-2-deoxy-α-D-glucose or with the corresponding galactose. The most convenient triacyl compounds are the O-triacetates and the reaction will be described using these compounds which will be referred to hereinafter as 1-chloro-N-acetylglucosamine triacetate and 1-chloro-N-acetylgalactosamine triacetate. The products formed by this reaction are 3′,4′,6′-triacetates, namely steroid-21-yl-tri - O - acetyl-β-D-2′-acetamido-2′-deoxy glucosides and galactosides. The O-acetyl groups are then removed by hydrolysis.

The reactions as applied to the preparation of glucosides may be represented as follows:

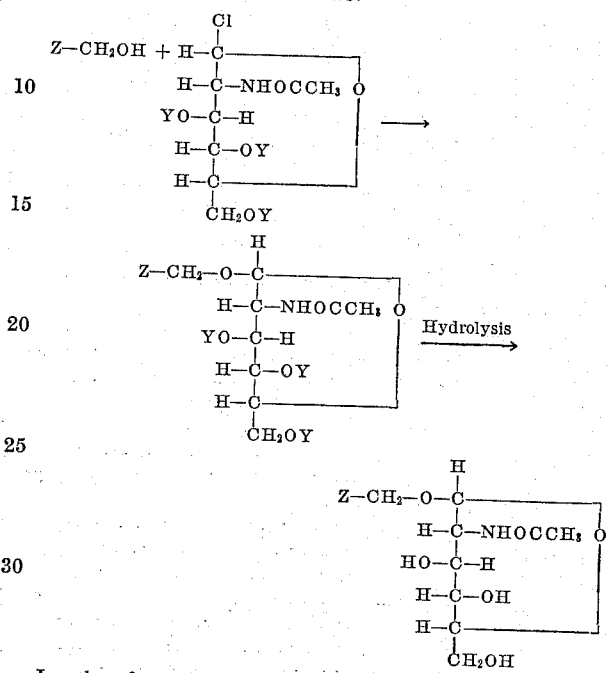

In the foregoing formulas Y stands for acyl and Z—CH₂O— has the same meaning as above. The 16-hydoxy derivatives are similarly prepared from 21-acyl compound, as are derivatives of other hydroxylated anti-inflammatory compounds.

The O-triacetate derivatives are conveniently prepared by reacting the starting compound, for example, the steroid with 1-chloro-N-acetylglucosamine triacetate or 1-chloro-N-acetylgalactosamine triacetate in an inert organic solvent or solvent mixture in the presence of a dehydrohalogenation-promoting agent such as mercuric cyanide, mercuric iodide or silver carbonate and heating at an elevated temperature, preferably in an inert atmosphere. The product is separated from the reaction mixture and may be purified by chromatography on alumina.

The hydrolysis reaction, which is preferably carried out in an inert atmosphere, is conveniently conducted by taking up the O-triacetate derivative in a lower alcohol such as methanol containing a metal alcoholate such as sodium methoxide and maintaining the mixture at room temperature for from ten minutes to an hour. The product is isolated by any convenient method. For example, the mixture can be adjusted to neutrality with a lower alkanoic acid followed by the addition of water and cooling. The product which separates on cooling is usually crystalline and is recovered by filtration.

In accordance with those procedures, there are obtained N-alkanoyl; for example N-acetamido-2′-deoxy-glucosides and galactosides of the following compounds which include the preferred Ring A unsaturated 11,17-bis-oxygenated-21-hydroxy-20-keto-pregnanes of the anti-inflammatory pregnane series: salicylic acid, hydroxybutazolidine, cortisone, hydrocortisone, and the Δ¹-derivatives thereof, prednisone and prednisolone; Δ⁶ and/or 16-hydroxy derivatives (including acetonides) of any of the foregoing; derivatives of any of these compounds having fluoro, chloro or bromo substituents attached to the 6, 9, 12 and/or 16-carbon atoms, and/or methyl substituents attached to the 2, 6, 12, 15 and/or 16 carbon atoms; and the like. Of particular interest are the derivatives of 16-methyl cortisone and hydrocortisone especially the 6,16-dimethyl compounds and their Δ⁶-derivatives and [3,2-c] pyrazolo derivatives thereof.

The new compounds of this invention are stable and possess anti-inflammatory activity characteristic of cortisone but exhibit greatly reduced undesirable side effects. They are normally administered in a daily maintenance dosage range comparable with that of the parent compound. For example, with the cortison and hydrocortisone derivatives the daily dosage is about 25 to 75 mg., for prednisolone it is about 2.5 to 10 mg. and for dexamethasone 0.25 to 5 mg. Because of their selective anti-inflammatory action (substantially unaccompanied by undesired side effects) they may, in acute cases be administered in substantially higher dosages without attendant risk of side effects; and, in milder conditions, may often be administered in substantially lower dosages in view of their pronounced anti-inflammatory action directly at the sight of the inflammation.

The compounds of this invention may be administered alone or associated with a pharmaceutically acceptable carrier the choice of which will depend upon the chosen route of administration and standard pharmaceutical practice. For oral administration, the compounds may be administered in the form of tablets containing excipients such as starch or milk sugar. Aqueous solutions such as elixirs which may be sweetened by flavoring may also be employed. For parenteral use, isotonic mixtures in pryogen-free water may be employed.

1-chloro-N-acetylglucosamine triacetate used as a starting material in the preparation of the compounds of this invention in accordance with the process described above is prepared by the following procedure.

A solution of 23 g. of clean sodium in 1000 ml. of methanol is used in 10 equal portions as described below: 21.5 g. of glusoamine hydrochloride and a 100 ml. aliquot of the above solution is swirled in a 250 ml. Erlenmeyer flask for exactly 70 seconds. The sodium chloride which separates is removed by filtration under pressure through a sintered glass funnel with a 2 l. round bottom flask. This operation is repeated nine more times and the total filter cake washed with 100 ml. of methanol. The total filtrate in the flask is treated under nitrogen with 153 g. of acetic anhydride and warmed for a short time. The solution is then stirred for approximately fifteen hours during which time the N-acetylglucosamine precipitates in approximately 70% yield. It is recovered by filtration, washed extensively with methanol and dried to constant weight, M.P. 202–204°.

This product is converted to the 1-chloro-O-triacetate derivative by the following procedure.

A suspension of 25 g. of N-acetylglucosamine and 70 ml. of acetyl chloride is stirred under nitrogen for ten minutes. At this point, 1 ml. of acetic acid saturated with HCl gas (at 0°) is added and after 15 minutes the mixture starts to gently reflux. At the end of two hours all of the material is in a yellow brown solution. The mixture is then stirred for approximately 15 hours, 500 ml. of chloroform is added, the mixture poured into 1 kg. of ice and stirred for three minutes. (The balance of this procedure should be carried out as rapidly as possible to insure maximum yields.) The mixture is separated and the chloroform layer added rapidly to an ice cold saturated sodium bicarbonate solution with vigorous stirring. The slightly alkaline mixture is again separated and the chloroform layer washed once with water, dried over anhydrous sodium sulfate, filtered and the filtrate evaporated to dryness in vacuo at about 35° C. The residue is taken up in ethyl acetate at 55–66°, filtered, seeded and the product allowed to crystallize overnight in the cold. The yield is 26.8 g. The product is protected from light and stored in a tightly stoppered container in the refrigerator.

1-chloro-N-acetylgalactosamine triacetate is prepared as described hereinabove but starting with galactosamine hydrochloride instead of glucosamine hydrochloride.

The following examples are given by way of illustration only and are not intended as limitations of this invention, many apparent variations of which are possible without departing from the spirit and scope thereof.

EXAMPLE I

*11,17-Dihydroxy-3,20-dione-1,4-pregnadiene-21-yl-D-2'-acetamido-2'-deoxy-glucopyranoside*

A total of 4.5 g. of 11,17,21-trihydroxy-1,4-pregnadiene-3,20-dione is taken up in 25 ml. of dry dimethylformamide containing 17.6 g. of mercuric cyanide and the mixture diluted with 25 ml. of dry xylene. A solution of 13.0 g. of 1-chloro-N-acetylglucosamine triacetate in 100 ml. of 1:1 dimethylformamide-xylene is added dropwise over a period of three hours while stirring the mixture under nitrogen at an oil bath temperature of 130–135° C. The mixture turns quite dark during the addition. It is maintained at 130–135° C. for an additional one and three quarter hours, cooled, diluted with 500 ml. of chloroform and washed four times with 500 ml. portions of water.

The aqueous layers are successively back-extracted with chloroform, the combined organic layers dried over anhydrous magnesium sulfate, filtered and the filtrate evaporated in vacuo. The residue is taken up in ethylene chloride and the solvent again removed in vacuo. The residue is then flushed twice with toluene and pumped (oil pump) at about 50° for several hours and then at room temperature overnight. The residue is taken up in chloroform and chromatographed on acid washed alumina (only about 10.5 parts alumina/part of solution) keeping the height to diameter ratio of alumina in the column at about 8:1. The column is eluted with methanol-chloroform mixtures containing successively larger proportions of methanol up to 95:5. The product, 11β,17α-dihydroxy-3,20-dione-1,4-pregnadiene-21-yl-tri-O-acetyl - β - D - 2'-acetamido-2'-deoxy-glucopyranoside is recovered from the middle fractions. Each fraction is taken to dryness. The first 2–3 fractions consist of a mobile oil. A small amount of methanol is added to subsequent fractions and those which crystallize on scratching are redissolved in chloroform, combined, filtered, taken to dryness and crystallized from ethanol.

A solution of 1.055 g. of the product thus prepared in 120 ml. of spectral grade methanol is treated with an equivalent quantity of freshly prepared sodium methoxide and kept at room temperature in a nitrogen atmosphere for ten minutes. The pH of the solution is adjusted to neutrality with acetic acid and the mixture filtered. About 6.5 ml. of water is added and the solution centrifuged. The desired product starts to precipitate in about ten minutes and the mixture is kept cold overnight. The desired product is recovered by filtration.

The procedure of the foregoing example is utilized to prepare 21-yl-β-D-2'-acetamido-2'-deoxy glucopyranosides and galactopyranosides of the following compounds. In each instance the intermediate O-triacetate is prepared. The list is given to avoid unnecessary repetition of experimental details.

16α-methyl-11β,17α,21-trihydroxy-1,4-pregnadiene-3,20-dione,
16β-methyl-11β,17α,21-trihydroxy-1,4-pregnadiene-3,20-dione,
9α-fluoro-16α-methyl-11β,17α,21-trihydroxy-1,4-pregnadiene-3,20-dione,
9α-fluoro-16β-methyl-11β,17α,21-trihydroxy-1,4-pregnadiene-3,20-dione, 6α-methyl-11β,17α,21-trihydroxy-1,4-pregnadiene-3,20-dione,
6α-fluoro-11β,17α,21-trihydroxy-1,4-pregnadiene-3,20-dione,
6α,16α-dimethyl-11β,17α,21-trihydroxy-1,4-pregnadiene-3,20-dione,
6,16α-dimethyl-11β,17α,21-trihydroxy-1,4,6-pregnatriene-3,20-dione,
9α-fluoro-11β,16α,17α,21-tetrahydroxy-1,4-pregnadiene-3,20-dione,
9α-fluoro-6,16α-dimethyl-11β,17α,21-trihydroxy-1,4,6-pregnatriene-3,20-dione,
17α,21-dihydroxy-1-allopregnene-3,11,20-triene,
9α-fluoro-11β,17α,21-trihydroxy-1-pregnene-3,20-dione,
11β,17α,21-trihydroxy-[3,2-c]-pyrazolo-4-pregnene-20-one,
11β,17α,21-trihydroxy-2'-phenyl-[3,2-c]-pyrazolo-4-pregnene-20-one,
9α-fluoro-11β,17α,21-trihydroxy-[3.2-c]-pyrazolo-4-pregnene-20-one,
9α-fluoro-16α-methyl-11β,17α,21-trihydroxy-[3,2-c]-pyrazolo-4-pregnene-20-one,
16α-methyl-11β,17α,21-trihydroxy-[3,2-c]-pyrazolo-4-pregnene-20-one,
17α,21-dihydroxy-4-pregnene-3,11,20-triene,
6,16α-dimethyl-11β,17α,21-trihydroxy-[3,2-c]-pyrazolo-4,6-pregnadiene-20-one,
6,16α-dimethyl-11β,17α,21-trihydroxy-2'-phenyl-[3,2-c]-pyrazolo-4,6-pregnadiene-20-one,
6,16α-dimethyl-11β,17α,21-trihydroxy-4,6-pregnadiene-3,20-dione,
6α-fluoro-11β,17α,21-trihydroxy-1,4-pregnadiene-3,20-dione.

EXAMPLE II

*9α - fluoro - 11β,17α,21 - trihydroxy - 3,20 - dione - 1,4-pregnadiene - 16α - yl - β - D - 2' - acetamido - 2' - deoxy - glucoside*

A total of 9 g. of 9α-fluoro-21-acetoxy-11β,17α-dihydroxy-1,4-pregnadiene-3,20-dione is taken up in 50 ml. of dimethylformamide containing 36 g. of mercuric cyanide and the mixture diluted with 50 ml. of dry xylene. A solution of 1-chloro-N-acetylglucosamine triacetate in 200 ml. of 1:1 dimethylformamide-xylene is added dropwise over a period of three hours while stirring the mixture under nitrogen at an oil bath temperature of 130–135° C. The mixture turns dark during the addition. It is maintained at 130–135° C. for an additional two hours, cooled, diluted with one liter of chloroform and washed four times with 500 ml. portions of water. The aqueous layers are successively back-extracted with chloroform, the combined organic layers dried over anhydrous magnesium sulfate, filtered and the filtrate evaporated in vacuo. The residue is taken up in ethylene chloride and the solvent again removed in vacuo. The residue is twice flushed with toluene (oil pump) at about 50° for several hours and then at room temperature overnight. The product, 9α-fluoro-21-acetoxy-11β,17α-dihydroxy-3,20-dione-1,4-pregnadiene - 16α - yl - tri - O - acetyl - β - D - 2'-acetamido - 2' - deoxy - glucoside is separated on acid washed alumina using mixtures of chloroform and methanol.

This product is hydrolyzed in accordance with the procedure of Example I to obtain the desired product.

The procedure of the foregoing example is utilized to prepare 16α - yl - β-D-2'-acetamido-2'-deoxy-glucopyranosides and galactosides of the following compounds. In each instance the intermediate O-triacetate is prepared. The list is given to avoid unnecessary repetition of experimental details.

9α-fluoro-11β,16α,17α,21-tetrahydroxy-4-pregnene-3,20-dione,
9α-fluoro-2-methyl-11β,16α,17α,21-tetrahydroxy-1,4-pregnadiene-3,20-dione,
6α,9α-difluoro-2-methyl-11β,16α,17α,21-tetrahydroxy-4-pregnene-3,20-dione,
6α,9α-difluoro-2α-methyl-11β,16α,17α,21-tetrahydroxy-1,4-pregnadiene-3,20-dione.

EXAMPLE III

*Ortho-carbomethoxyphenyl-β-D-2'-acetamido-2'-deoxy-glucoside*

To a mixture of 62.3 g. of anhydrous potassium carbonate, 34.7 ml. of methyl salicylate and 1380 ml. of acetone is added 57 g. of 1-chloro-N-acetylglucosamine triacetate. The mixture is stirred at room temperature for 21 hours and filtered. The solvent is removed at low pressure and the residue triturated with ether to crystallize O - carbomethoxyphenyl - tri - O - acetyl - β - D - 2'-acetamido-2'-glucoside which is converted to ortho-carbomethoxyphenyl-β-D-2'-acetamido-2'-deoxy glucoside by hydrolysis with sodium methoxide in accordance with the procedures of the foregoing examples.

To a suspension of 30.1 g. of the above-prepared compound in one liter of water is added 87 ml. of 1 N sodium hydroxide solution. The mixture is stirred for three hours and sufficient Dry Ice (about 5 g.) added to clear the solution. When the Dry Ice disappears, the mixture is freeze-dried to yield the desired product as the sodium salt. It may be purified by recrystallization from ethanol or methanol-isopropanol mixtures.

The sodium salt is converted to the acid by acidifying a cold, concentrated solution of the salt, filtering quickly and washing with a small amount of cold water.

Each of the compounds in this example is generally useful as an anti-inflammatory compound in the same manner as aspirin. They are especially useful since they behave similarly to enteric-coated capsules. On oral administration, there is a delay before significant amounts are absorbed. Moreover, the release of the total active ingredient is prolonged over an extended period of time.

Galactosides of these compounds which are similarly useful are prepared in the same manner.

EXAMPLE IV

*Hydroxybutazolidine-β-D-2'-acetamido-2'-deoxy-glucoside*

A mixture containing 500 mg. of hydroxybutazolidine and 1.6 mM. of sodium hydroxide and an equivalent amount of 1-chloro-N-acetylglucosamine triacetate in 500 ml. of acetone is stirred under nitrogen at room temperature for three hours. At the end of this time the solvent and a small amount of water is removed by distillation at low pressure. The residue is washed with water and taken up in methylene chloride. The insoluble portion is removed by filtration and the filtrate distilled at low pressure to leave the desired product as a residue.

The O-acetyl groups are removed using methanol and sodium methoxide in accordance with the procedure of Example I.

The corresponding galactosaminide is similarly prepared.

The compounds prepared in accordance with this example are useful in the same manner as those prepared in Example III.

Various changes and modifications may be made in carrying out the present invention without departing from the spirit and scope thereof. Insofar as these changes and modifications are within the purview of the annexed claims, they are to be considered as part of our invention.

The ring A unsaturated 11,17 - bis - oxygenated - 16-methyl-20-keto-pregnane 21-free alcohols, more particularly, the 16α- and 16β-methyl derivatives of cortisone and hydrocortisone, their Δ¹-derivatives, 6-methyl and 6-methyl-Δ⁶ derivatives of the foregoing, and [3,2-c]pyrazolo-analogues thereof, used as starting materials in the foregoing examples, are prepared in accordance with the following procedures:

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 3α-acetoxy-16-pregnene-11,20-dione in 175 ml. of ether. A white granular solid separates during this addition. The resulting mixture is heated under gentle reflux for two hours after which the reaction mixture is cooled, and 125 ml. of saturated, aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. The latter material is heated for 15 minutes at 60–70° C. with a mixture of 25 ml. acetic anhydride and 25 ml. pyridine and the acetylated product is purified by chromatography on acid-washed alumina followed by crystallization from petroleum ether to give approximately 1.5 g. of substantially pure 3α-acetoxy-16α-methyl-pregnane-11,20-dione.

To a solution of 0.8 g. of 3α-acetoxy-16α-methyl-pregnane-11,20-dione in 40 ml. of methanol is added 1.5 ml. of concentrated aqueous hydrochloric acid and the resulting solution is stirred overnight at about 25° C. The reaction solution is evaporated in vacuo at 25° C. to a small volume, and the concentrated solution is poured into 50 ml. of ice water. The white solid which precipitates is recovered by filtration, washed with water and recrystallized from ethyl acetate to give 3α-hydroxy-16α-methyl-pregnane-11,20-dione.

A solution of 22 g. of 3α-acetoxy-16α-methyl-pregnane-11,20-dione and 1 g. of p-toluene-sulfonic acid in 250 ml. of acetic anhydride is heated at reflux under nitrogen for a period of approximately 3 days. Two grams of potassium acetate (anhydrous) is added, and the volatile solvents are separated by distillation in vacuo. The residual material is extracted with benzene, and the benzene extract is filtered to remove insoluble material. The benzene extracts are evaporated to a volume of 100 ml. and petroleum ether is added to the cloud point. The resulting solution is adsorbed on 660 g. of acid-washed alumina; the alumina adsorbate is then washed with 2 liters of petroleum ether. The adsorbate is then eluted with 85:15 petroleum ether-ether mixture, and the first four liters of eluate is collected, and evaporated to dryness in vacuo to give a mixture of enol acetates containing 3α,20-diacetoxy-16α-methyl-17(20)-pregnene-11-one. This mixture of enolates, weighing approximately 14 g., is dissolved in 50 ml. of benzene and treated with an excess of perbenzoic acid over a 16-hour period. The reaction mixture is shaken with dilute aqueous potassium hydroxide solution until the benzene layer is free of per-benzoic acid; the benzene layer is then washed with water until neutral, dried, and the solvent evaporated in vacuo to give a crystalline material, 17α,20-epoxy-3α,20-diacetoxy-16α-methyl-pregnane-11-one. The latter material is dissolved, without purification, in 200 ml. of methanol, 120 ml. of water and 10 g. of potassium bicarbonate, and the resulting solution is heated at reflux under nitrogen for a period of 16 hours. The methanol is evaporated from the hydrolysis solution in vacuo, and the residual oil is extracted from the resulting aqueous solution with chloroform. The chloroform extract is washed with water to neutrality, dried, and the chloroform is evaporated under reduced pressure. The residual oil is triturated with ether, and the crystalline material thus formed is recrystallized from ethyl acetate-petroleum ether to give 3α,17α-dihydroxy-16α-methyl-pregnane-11,20-dione.

To a solution of 7.0 g. of 3α,17α-dihydroxy-16α-methyl-pregnane-11,20-dione in 50 ml. of chloroform is added dropwise with stirring a solution containing 3.36 g. of bromine in 24.2 ml. of chloroform over a period of about 60 minutes. he reaction mixture is dissolved in 200 ml. of ethyl acetate, and the resulting solution washed with water until neutral, dried, and the solvents evaporated therefrom in vacuo. The residual crude material is dissolved in a minimum quantity of ethyl acetate, the resulting solution is diluted with ether, and the mixture is stirred until crystals form. The crystalline product is recovered by filtration and washed, by stirring, with 50:50 ether-petroleum ether mixture to give about 5 g. of 21 - bromo-3α,17α-dihydroxy-16α-methyl-pregnane-11,20-dione.

This 5 g. of 21 - bromo - 3α,17α - -dihydroxy - 16α - methyl - pregnane - 11,20 - dione is mixed with 5.0 g. of anhydrous potassium acetate, 4.0 g. of sodium iodide and 0.03 ml. of glacial acetic acid, and 100 ml. of acetone is added to the resulting mixture. This mixture is then heated at reflux, with stirring, for a period of about 16 hours, and the reaction mixture is cooled, filtered, and the insoluble material is washed with acetone. The filtered solution is evaporated in vacuo thereby removing the solvents, and the residual material is slurried with water, and the aqueous mixture extracted with ethyl acetate. The ethyl acetate extract is washed with water to neutrality, dried, and the solvent is evaporated in vacuo to give an oil. This oil is crystallized from ether, and recrystallized from ethyl - acetate - ether to give 3α,17α,21 - trihydroxy - 16α - methyl - pregnane - 11,20 - dione 21-acetate.

Solution of 400 mg. of 3α,17α,21 - trihydroxy - 16α-methyl - pregnane - 11,20 - dione 21 - acetate in 4 ml. of pyridine is added to the complex formed by the addition of 400 mg. of chromium trioxide to 4 ml. of pyridine. The mixture is swirled until thoroughly mixed, and then allowed to stand at room temperature overnight. The reaction mixture is poured into water, and the aqueous mixture is extracted with ether, and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl acetate to give 17α,21 - dihydroxy - 16α - methyl - pregnane - 3, 11,20-trione 21-acetate.

To 100 mg. of 17α,21 - dihydroxy - 16α - methyl-pregnane - 3,11,20 - trione 21 - acetate dissolved in 2 ml. of chloroform and 2.25 ml. of glacial acetic acid, at a temperature of —55° C., is added two drops of a 0.001 N solution of dry HBr in glacial acetic acid. To about 0.38 ml. of 0.001 N HBr in glacial acetic acid, at —55° C., is added 0.43 ml. of a solution containing 40 mg. of bromine in chloroform, and the resulting solution is added, over about a 10-minute period, to the solution of the steroid, while maintaining the reaction mixture at about —55° C. The reaction mixture is allowed to stand at —55° C. for about one-half hour; a solution containing 250 mg. of sodium acetate in 3 ml. of water is added, and the resulting mixture is stirred for about 5 minutes. Five milliliters of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 2 ml. of acetone, and to the solution is added 25 mg. of sodium bromide and 1 ml. of water. The resulting mixture is heated under reflux for a period of about 5 hours, the reaction mixture is cooled, and the acetone is evaporated in vacuo. The residual material is extracted into ether, the ether extract is washed with water, dried, and the solvent is evaporated to a volume of about 1 ml.; petroleum ether is added to this solution, and the crystalline material which separates is recovered and dried to give approximately 90 mg. of 4-bromo-17α,21-dihydroxy-16α-methyl-pregnane-3,11,20-trione 21-acetate.

A mixture of 48 mg. of semicarbazide, 48 mg. of 4-bromo - 17α,21 - dihydroxy - 16α - methyl - pregnane - 3, 11,20-trione 21-acetate and 0.6 ml. of ethanol is heated under reflux in contact with a nitrogen atmosphere for a period of about three days, and the reaction solution is evaporated to a small volume, diluted with water and the crystalline material recovered and purified by recrystallization from equeous methanol to give 3,20-bis-semicarbazido-17α, 21 - dihydroxy - 16α - methyl - 4-pregnene-3,11,20-trione 21-acetate. Fifty milligrams of 3, 20 - bis - semicarbazido - 17α,21 - dihydroxy - 16α-methyl-4 - pregnene - 3,11,20 - trione 21-acetate is dissolved in a mixture of 1.0 cc. of benzene and 1.0 cc. of 1.1 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give 3,20 - bis - semicarbazido - 17α,21 - dihydroxy-16α - methyl - 4-pregnene-3,11,20-trione.

A mixture of 60 mg. of 3,20 - bis - semicarbazido-17α, 21 - dihydroxy - 16α - methyl - 4 - pregnene-3,11,20-trione, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform - dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 17α,21 - dihydroxy - 16α - methyl-4-pregnene-3,11,20-trione.

A solution of 45 mg. of 3,20-bis-semicarbazido-17α,21-dihydroxy-16α-methyl-4-pregnene - 3,11,20 - trione 21-acetate, 17 mg. of sodium borohydride, 1 ml. of tetrahydrofuran and 1.3 ml. of water is maintained at reflux temperature for approximately one hour. The reaction solution is cooled to about 15° C., and the excess sodium borohydride decomposed by the addition of a solution of 27 mg. of glacial acetic acid in 0.2 ml. of water. The tetrahydrofuran is evaporated in vacuo, and the residual material is extracted with ethyl acetate. The ethyl acetate extracts are washed with a saturated salt solution, water, 5% aqueous sodium bicarbonate solution and again with water. The extracts are dried and the ethyl acetate evaporated in vacuo to give 3,20 - bis-semicarbazido - 11β,17α,21 - trihydroxy-16α-methyl-4-pregnene-3,20-dione.

A mixture of 60 mg. of 3,20-bis-semicarbazido-11β, 17α,21 - trihydroxy-16α-methyl-4-pregnene-3,20-dione, 0.2 ml. of dimethylformamide, 0.6 ml. of chloroform, and 1.5 ml. of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added and the resulting solution is subjected to a partition chromatogram using aqueous methanol as the stationary phase and benzene-chloroform as the moving phase to give 11β,17α,21-trihydroxy-16α-methyl-4-pregnene-3,20-dione. The latter material is reacted with an excess of acetic anhydride in pyridine at room temperature for a period of about fifteen hours, and the crude acetylated product is recrystallized from ethyl acetate to give 11β,17α,21-trihydroxy-16α-methyl-4-pregnene-3,20-dione 21-acetate.

To a cooled solution of 600 mg. of 11β,17α,21-trihydroxy-16α-methyl-4-pregnene-3,20-dione 21-acetate in 5.0 ml. of dry pyridine is added 1.15 ml. of phosphorous oxychloride, and the mixture is allowed to stand at room temperature for a period of approximately 15 hours. The reaction solution is evaporated in vacuo at a temperature of about 20° C. to a volume of 2–3 ml. Seventeen milliliters of water is added slowly to the concentrated solution, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized from ethyl acetate-ether to give 17α,21-dihydroxy-16α-methyl-4,9(11)-pregnadiene-3,20-dione 21-acetate. A suspension of 330 mg. of 17α,21-dihydroxy-16α-methyl-4,9(11)-pregnadiene-3,20-dione 21-acetate and 1.8 g. of N-bromo-succinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two and one-half hours during which time the solid material slowly dissolves. The resulting yellow solution is treated with 1.0 ml. of allyl alcohol to discharge the color and decompose the remaining N-bromo-succinimide, and the resulting solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α - bromo - 11β,17α,21 -trihydroxy - 16α - methyl-4-pregnene-3,20-dione 21-acetate.

A solution of 210 mg. of 9α-bromo-11β,17α,21-trihydroxy-16α-methyl-4-pregnene-3,20-dione 21-acetate and 240 mg. of potassium acetate in 10 ml. of absolute ethanol is heated under reflux for two hours. The reaction mixture is cooled to room temperature, and evaporated in vacuo to a small volume. The concentrated aqueous mixture is extracted with three portions of ethyl acetate, and the combined ethyl acetate extracts are washed with water, dried, evaporated to dryness in vacuo. The residual material is crystallized from ethyl acetate-ether to give 9β,11β - epoxy-17α,21-dihydroxy-16α-methyl-4-pregnene-3,20-dione 21-acetate. To a solution of 83 mg. of anhydrous hydrogen fluoride in 4.7 ml. of ice-cold alcohol-free chloroform is added an ice-cold solution of 416 mg. of 9β,11β - epoxy - 17α,21 - dihydroxy-16α-methyl-4-pregnene-3,20-dione 21-acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 9α - fluoro-11β,17α,21-trihydroxy-16α-methyl-4-pregnene-3,20-dione 21-acetate. Fifty milligrams of 9α - fluoro-11β,17α,21-trihydroxy - 16α - methyl - 4 - pregnene - 3,20-dione 21-acetate is dissolved in a mixture of 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α - fluoro - 11β,17α,21 - trihydroxy-16α-methyl-4-pregnene-3,20-dione.

A solution of 400 mg. of 9α-fluoro-11β,17α,21-trihydroxy-16α-methyl-4-pregnene-3,20-dione 21-acetate in 4 ml. of pyridine is added to the complex formed by the addition of 400 mg. of chromium tri-oxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from ethyl actate-ether to give 9α - fluoro-17α,21-dihydroxy-16α-methyl-4-pregnene-3,11,20-trione 21-acetate. Fifty milligrams of 9α-fluoro-17α,21 - dihydroxy - 16α-methyl-4-pregnene-3,11,20-trione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro-17α,21-dihydroxy-16α-methyl-4-pregnene-3,11,20-trione.

To a solution of 110 mg. of 17α,21-dihydroxy-16α-methyl-4-pregnene-3,11,20-trione 21-acetate in 6 ml. t-butanol, 0.01 ml. glacial acetic acid and 0.03 ml. of acetic anhydride is added 70 mg. of selenious acid ($H_2SeO_3$). The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and choloroform, increasingly rich in chloroform. The 4:6 ether-chloroform eluates are combined, evaporated to dryness, and the residual material recrystallized from ethyl acetate-ether to give 17α,21-dihydroxy-16α-methyl-1, 4-pregnadiene-3,11,20-trione 21-acetate; M.P. 208–212° C. Fifty milligrams of 17α,21-dihydroxy-16α-methyl-1,4-pregnadiene-3,11,20-trione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 17α-21-dihydroxy-16α-methyl-1,4-pregnadiene,3,11-20-trione.

To a solution of 100 mg. of 11β,17α,21-trihydroxy-16α-methyl-4-pregnene-3,20-dione 21-acetate in 6 ml. t-butanol, 0.01 ml. glacial acetic acid and 0.03 ml. of acetic anhydride is added 70 mg. of selenious acid. The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate-ether to give 11β,17α,21 - trihydroxy-16α-methyl-1,4-pregnadiene-3,20-dione 21-acetate. Fifty milligrams of 11β,17α,21-trihydroxy-16α-methyl - 1,4 - pregnadiene-3,20-dione 21-acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 11β,17α,21 - trihydroxy - 16α-methyl-1,4-pregnadiene-3,20-dione.

To a solution of 110 mg. of 9α - fluoro - 17α,21 - dihydroxy - 16α - methyl - 4 - pregnene - 3,11,20 - trione 21-acetate in 6 ml. t-butanol, 0.01 ml. glacial acetic acid and 0.03 ml. of acetic anhydride is added 70 mg. of selenious acid ($H_2SeO_3$). The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed on activated alumina. It is eluted with ether-petroleum ether and then with mixtures of ether and chloroform, increasingly rich in chloroform. The 4:6 ether-chloroform eluates are combined, evaporated to dryness, and the residual material recrystallized from ethyl acetate ether to give 9α - fluoro - 17α,21 - dihydroxy - 16α-methyl - 1,4 - pregnadiene - 3,11,20 - trione 21 - acetate. Fifty milligrams of 9α - fluoro - 17α,21 - dihydroxy - 16α-methyl - 1,4 - pregnadiene - 3,11,20 - trione 21 - acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α - fluoro - 17α,21 - dihydroxy - 16α - methyl-1,4 - pregnadiene - 3,11,20 - trione.

To a solution of 100 mg. of 9α - fluoro - 11β,17α,21-trihydroxy - 16α - methyl - 4 - pregnene - 3,20 - dione 21-acetate in 6 ml. t-butanol, 0.01 ml. glacial acetic acid and 0.03 ml. of acetic anhydride is added 70 mg. of selenious acid. The mixture is heated to the boiling point overnight, another 50 mg. of selenious acid is added, and the heating is continued for an additional 24 hours. The solution is decanted from metallic selenium and evaporated to an oil which is then dissolved in ethyl acetate. The ethyl acetate solution is washed with aqueous sodium bicarbonate and then with water until neutral, and dried. The solvent is evaporated from the dried solution to give an oil which is dissolved in benzene and adsorbed from this solvent on acid-washed alumina. The adsorbate is eluted with ether-petroleum ether and then with mixtures of ether and chloroform, increasingly rich in chloroform. The 4:6 ether-chloroform eluates are combined, evaporated to dryness, and the residual material recrystallized from ethyl acetate - ether to give 9α - fluoro-11β,17α,21 - trihydroxy - 16α - methyl - 1,4 - pregnadiene - 3,20 - dione 21 - acetate. Fifty milligrams of 9α - fluoro - 11β,17α,21 - trihydroxy - 16α - methyl - 1,4-pregnadiene - 3,20 - dione 21 - acetate is dissolved in a mixture of 1.0 cc. of benzene and 1.0 cc. of 1 N methanolic potassium hydroxide, and the solution is allowed to stand at room temperature for a period of about ten minutes. The solution is then acidified with acetic acid, the benzene is evaporated in vacuo, and the residual material is crystallized from ethyl acetate-ether to give 9α-fluoro - 11β,17α,21 - trihydroxy - 16α - methyl - 1,4-pregnadiene-3,20-dione.

In a 500 ml. 3-neck flask equipped with condenser, dropping funnel and nitrogen inlet are placed 20 g. of potassium hydroxide in 90 ml. of water, 100 ml. of methanol and 100 ml. of ether. A solution of 10 g. of N-methyl-N-nitrosotosylamide in 50 ml. of ether is placed in the dropping funnel.

Diazomethane is generated by warming the generation flask to 40–45° C. and cautiously adding the N-methyl-N-nitrosotosylamide-ether from the dropping funnel. Nitrogen is utilized to sweep the diazomethane into a solution of 20 g. of 3α - acetoxy 16 - pregnene - 11,20-dione in 100 ml. of tetrahydrofuran and 120 ml. of ether. The process is continued until the steroid solution remains yellow for several hours. The product, 3α - acetoxy-16α,17α-methyleneazo-pregnane 11,20-dione largely precipitates from the reaction mixture. After 16 hours, the mixture is filtered, washed with ether and dried in air. Yield about 14 grams, M.P. 186–190° C.

37.4 g. of 3α - acetoxy - 16α,17α - methyleneazo - pregnane - 11,20 - dione is placed in a 500 ml. round-bottom flask and heated by an oil bath in vacuo (pressure 0.6 mm.). A manometer and 12-liter surge flask are in the line between the reaction flask and pump trap. When the bath temperature reaches 180° C. the 3α - acetoxy-16α,17α - methyleneazo - pregnane - 11,20 - dione begins to melt with evolution of nitrogen. The maximum pressure reached is 83 mm. After 10 minutes at 180–182° C. the melt is cooled. It has

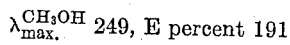

$\lambda^{CH_3OH}_{max.}$ 249, E percent 191 and is taken up in about 150 ml. of acetone, filtered through diatomaceous earth, concentrated to about 100 ml., and ether is slowly added to the boiling solution until crystallization occurs. These crystals of 3α - acetoxy - 16-methyl - 16 - pregnene - 11,20 - dione weigh about 19.0 g., M.P. 165–168° C.

A solution of 20.0 g. of 3α - acetoxy - 16 - methyl - 16-pregnene - 11,20 - dione dissolved in 60 ml. of methanol, is cooled to 18° C., and 80 ml. of 30% hydrogen peroxide followed by 80 ml. of 2.5 N sodium hydroxide are added. Considerable material precipitates from solution, but all redissolves on stirring the reaction mixture at 25–30° C. for 40 minutes. The solution is kept at 15°–20° C. for 18 hours at which time the ultraviolet maximum at 249 has completely disappeared. Then 600 ml. of saturated salt water is slowly added, the crystalline precipitate is filtered, washed with water, and dried in air and in vacuum. The 16α,17α - epoxy - 3α - hydroxy - 16β-methyl - pregnane - 11,20 - dione thus formed weighs about 17 g.; M.P. 176–177° C.; hexagonal prisms M.P. 178–180° C. from acetone-ether.

To a solution of 2.69 g. of 16α,17α-epoxy-3α-hydroxy-16β-methyl-pregnane-11,20-dione in 55 ml. dioxane is added 2.7 ml. of 2 M aqueous perchloric acid. The clear solution is kept at 25–30° C. for 65 hours. Cold water (175 ml.) is added, the slurry chilled to 8° C. and filtered after 30 minutes. The precipitate, containing a mixture of 3α,17α-dihydroxy - 16-methyl - 15-pregnene-11,20-dione and 3α,17α-dihydroxy-16-methylene-pregnane-11,20-dione is washed with water, and dried in air and finally at 50° C. in vacuum. Yield: approximately 2 g.; M.P. sintering at about 150° C., melting at 158–167° C. The relative proportion of 3α,17α-dihydroxy-16-methyl-15-pregnene-11,20 - dione and 3α,17α - dihydroxy-16-methylene-pregnane-11,20-dione is estimated to be of the order of 1:1.

A solution 3.05 g. (8.47 millimols) of the olefin mixture of 3α,17α-dihydroxy-16-methylene-pregnane-11,20-dione in 80 ml. of methanol is reduced in hydrogen at 1 atmosphere and 25° C. in the presence of 2.0 g. of 25% palladium-calcium carbonate catalyst. Modification of the hydrogen conditions, pH, solvent, catalyst, etc. alters the isomer ratio significantly. Uptake of the calculated amount of hydrogen is complete in 45 minutes. The mixture is stirred an additional 30 minutes and filtered through diatomaceous earth. The colorless filtrate is taken to dryness and crystallized from ether; a mixture of 3α,17α-dihydroxy-16α-methyl-pregnane-11,20-dione and 3α,17α-dihydroxy-16β-methyl - pregnane - 11,20 - dione is obtained; weight about 3 g., sintering at 150° C. melting at 166–182° C.

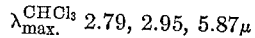

$\lambda^{CHCl_3}_{max.}$ 2.79, 2.95, 5.87μ

The product consists of 3α,17α-dihydroxy-16α-methyl-pregnane-11,20-dione and 3α,17α-dihydroxy-16β-methyl-pregnane-11,20-dione in the ratio ca. 7:3 as determined by the amounts of end product isolated below.

One gram of this hydrogenation product containing 3α,17α-dihydroxy-16α-methyl - pregnane-11,20-dione and 3α,17α-dihydroxy-16β-methyl - pregnane-11,20-dione, is chromatographed on 100 g. of activitated magnesium silicate. The 100% chloroform eluates give 3α,17α-dihydroxy-16α-methyl-pregnane-11,20-dione, M.P. 188–191° C. The 5% methanol-chloroform eluates give 3α,17α-dihydroxy-16β-methyl - pregnane - 11,20-dione, hexagonal plates from benzene-ethylacetate; M.P. 192–197° C.

A solution of 3.50 g. (9.7 millimols) of 3α,17α-dihydroxy-16β-methyl-pregnane-11,20-dione in 40 ml. of chloroform is warmed to 40–45° C. A solution of 1.76 g. (11 millimols) of bromine in 25 ml. of chloroform is added dropwise to the stirred solution such that the color is not darker than pale yellow (ca. 2 drops/sec., total time 1 hour). The nearly colorless solution is cooled to 20° C. and 200 ml. of ether is added. The mixture is extracted with excess cold 5% potassium bicarbonate solution, sodium bisulfite solution, and water, and dried over magnesium sulfate. The colorless residue after removal of solvent, 21-bromo-3α,17α-dihydroxy-16β-methyl - pregnane-11,20-dione (about 4 grams) gives a positive tetrazolium test.

To 4.30 g. of 21-bromo-3α,17α-dihydroxy-16β-methyl-pregnane-11,20-dione in 90 ml. of acetone and 0.01 ml. of acetic acid is added 4.83 g. of anhydrous potassium acetate and 3.85 g. of potassium iodide. The stirred mixture is refluxed for 18 hours and concentrated on the water pump to a small volume. Water is added, the product extracted into ethyl acetate, and the organic extract dried over magnesium sulfate to give about 4 grams of a colorless foam that partly crystallizes from acetone-ether to give 3α,17α,21-trihydroxy-16β-methyl - pregnane-11,20-dione 21-acetate.

To a solution of 3α,17α,21-trihydroxy-16β-methyl-pregnane-11,20-dione 21-acetate (4.0 g.) in 100 ml. t-butanol and 20 ml. of water cooled to 10–15° C., is added 3.5 g. N-bromosuccinimide. The suspension is stirred at 15° C. until all the N-bromosuccinimide has dissolved (90 minutes). The reaction mixture is kept at 2° C. for about sixteen hours and at 25° C. for 2 hours. Sodium sulfite solution is added to destroy bromine and the mixture concentrated on the water pump to a low volume. A granular precipitate forms; water is added, the precipitate filtered and washed with water; chromatography on neutral alumina and elution with mixtures of chloroform and benzene gives 17α,21-dihydroxy-16β-methyl - pregnane-3,11,20-trione 21-acetate, M.P. 210–213° C.

To a stirred solution of 585 mg. of 17α,21-dihydroxy-16β-methyl-pregnane-3,11,20-trione 21-acetate in 10 ml. of acetic acid and 8 ml. of chloroform kept at 10° C. is added slowly 230 mg. of bromine in 6 ml. of chloroform. After addition is complete, 1.2 g. of sodium acetate in 7 ml. of cold water is added and the mixture is extracted with chloroform. The chloroform extract is washed with dilute potassium bicarbonate, water and dried over sodium sulfate. The residue is triturated with ether to give 480 mg. of crystalline 4-bromo-17α,21 - dihydroxy-16β-methyl-pregnane-3,11,20-trione 21-acetate, M.P. 165–170° C. dec.

To 583 mg. of 4-bromo-17α,21-dihydroxy-16β-methyl-pregnane-3,11,20-trione 21-acetate in 20 ml. of acetonitrile under nitrogen is added a slurry of 600 mg. of semicarbazide hydrochloride and 410 mg. sodium bicarbonate in 4 ml. of water. After 2 hours, the acetonitrile is removed in vacuo, water is added and about 540 mg. of crystalline 3-semicarbazone of 17α,21-dihydroxy-16β- methyl-4-pregnene-3,11,20-trione 21-acetate filtered, washed with water and dried.

540 mg. of the 3-semicarbazone of 17α,21-dihydroxy-16β-methyl-4-pregnene-3,11,20-trione 21-acetate is dissolved in 20 ml. of acetic acid, 1.5 ml. of pyruvic acid and 5 ml. of water. After 18 hours at 25° C., water is added and the mixture extracted with chloroform. The chloroform extract is washed with aqueous potassium bicarbonate, water and dried over sodium sulfate. Removal of solvent gives crude 17α,21-dihydroxy-16β-methyl-4-pregnene-3,11,20-trione 21-acetate which is purified by chromatography on neutral alumina and crystallization from acetone-ether (hexagonal plates). The pure material has M.P. 226–232° C. 100 mg. of 17α,21-dihydroxy-16β-methyl-4-pregnene-3,11,20-trione 21-acetate in 3 ml. of methanol is treated with 0.1 g. of potassium bicarbonate in 1 ml. of water, the methanol is evaporated in vacuo, and the residual material is extracted with ethyl acetate. Evaporation of the ethyl acetate solution gives crystalline 17α,21 - dihydroxy-16β-methyl-4-pregnene-3,11,20-trione.

To a stirred solution of 500 mg. of 17α,21-dihydroxy-16β-methyl-4-pregnene-3,11,20-trione 21-acetate in 12.5 ml. of methanol and 3 ml. of dimethylformamide kept under nitrogen is added a slurry of 680 mg. of semicarbazide hydrochloride and 370 mg. of sodium bicarbonate in 1 ml. of water. The stirred mixture is refluxed 3½ hours and maintained at 45° C. for 17 hours. It is then cooled to 20° C. and 50 ml. of 50% saturated aqueous sodium chloride is added. After 2 hours at 0° C. the precipitate of 3,20-bis-semicarbazido-17α,21-dihydroxy-16β-methyl-4-pregnene-3,11,20-trione 21-acetate is filtered, washed with water until free of chloride ion and dried in air.

To a stirred solution of 600 mg. of 3,20-bis-semicarbazido-17α,21-dihydroxy-16β-methyl-4-pregnene - 3,11,20-trione 21-acetate in 30 ml. of tetrahydrofuran and 11 ml. of water under nitrogen is added 200 mg. powdered sodium borohydride. The stirred suspension is refluxed 45 minutes and then cooled to 15° C. Aqueous acetic acid (3 ml. of 30%) is added cautiously and most of the tetrahydrofuran is removed in vacuum. Addition of 5 ml. of methanol and 5 ml. of water induces the product to crystallize. Following addition of 10 ml. of a saturated sodium chloride solution and aging at 0° C. the product 3,20-bis-semicarbazido-11β,17α,21-trihydroxy-16β-methyl-4 - pregnene-3,20-dione is filtered, washed with water, and dried in air.

To a solution of 510 mg. of reduced 3,20-bis-semicarbazido-11β,17α,21-trihydroxy-16β-methyl-4-pregnene - 3,20-dione in 5 ml. of acetic acid is added 1.20 ml. of water and 0.50 ml. of pyruvic acid. The solution is kept at 25° C. for eighteen hours. Water (20 ml.) is added, and the mixture is extracted thoroughly with chloroform. The chloroform extract is dried over magnesium sulfate and taken to dryness. The residue is crystallized from acetone-ether to give pure 11β,17α,21-trihydroxy-16β-methyl-4-pregnene-3,20-dione. A solution of 100 mg. of 11β,17α,21-trihydroxy-16β-methyl-4-pregnene-3,20-dione in 1.0 ml. of pyridine and 0.5 ml. of acetic anhydride is prepared. After 18 hours at 25° C., the solution is taken to dryness in vacuo and the solid residue purified by crystallization from acetone-ether to give 11β,17α,21-trihydroxy-16β-methyl-4-pregnene-3,20-dione 21-acetate.

A solution of 400 mg. of 11β,17α,21-trihydroxy-16β-methyl-4-pregnene-3,20-dione 21-acetate in 2.0 ml. dimethyl formamide, 0.8 ml. of pyridine and 0.4 ml. of methanesulfonyl chloride is kept at 75° C. for one hour. The mixture is cooled, water added, and the precipitate filtered, washed with water and dried in air. The desired 17α,21 - dihydroxy-16β-methyl-4,9(11)-pregnadiene-3,20-dione 21-acetate is purified by chromatography on alumina (20 g.) and elution of the column with benzene. Crystallization of material eluted by benzene gives pure 17α,21-dihydroxy-16β-methyl-4,9(11)-pregnadiene-3,20-dione 21-acetate.

To a mixture of 620 mg. of 17α,21-dihydroxy-16β-methyl-4,9(11)-pregnadiene-3,20-dione 21-acetate and 330 mg. of N-bromosuccinimide in 10 ml. of dioxane and 3.2 ml. of water cooled to 10° C. is added 1.8 ml. of cold 1 M aqueous perchloric acid. The mixture is stirred at 15° C. for 3 hours. Excess N-bromosuccinimide is destroyed by addition of aqueous sodium thiosulfate and most of the dioxane is removed in vacuo. About 30 ml. of water is added and crystalline bromohydrin, 9α-bromo-11β,17α,21 - trihydroxy-16β-methyl-4-pregnene-3,20-dione 21-acetate, is filtered, washed with water, and dried in air.

To the stirred solution of 100 mg. of the 9α-bromo-11β,17α,21-trihydroxy-16β-methyl-4-pregnene-3,20 - dione 21-acetate in 3 ml. of tetrahydrofuran and 1 ml. of methanol under nitrogen is added 1.02 ml. of 0.215 N methanolic sodium methoxide. After 10 minutes at 25° C., 0.2 ml. of acetic acid is added and the methanol removed in vacuo. The residue is acetylated with 1.00 ml. of pyridine and 0.5 ml. of acetic anhydride at 60° C. for 70 minutes. The mixture is taken to dryness in vacuo, water added, and the product extracted into chloroform. The residue is crystallized from ether-acetone to give pure 9β,11β-epoxy-17α,21-dihydroxy - 16β - methyl-4-pregnene-3,20-dione 21-acetate.

To a solution of 200 mg. of 9β,11β-epoxy-17α,21-dihydroxy-16β-methyl-4-pregnene-3,20-dione 21-acetate in 2 ml. of chloroform and 2 ml. of tetrahydrofuran in a polyethylene bottle at 60° C. is added 2 ml. of a 2:1 (by weight) mixture of anhydrous hydrogen fluoride and tetrahydrofuran. After 4 hours at −10° C. the mixture is cooled to −60° C. and cautiously added to a stirred mixture of 30 ml. of 25% aqueous potassium carbonate and 25 ml. of chloroform kept at −5° C. The aqueous phase is further extracted with chloroform and the latter phase washed with water and dried over magnesium sulfate. The residue on crystallization from acetone-ether gives pure 9α-fluoro-11β,17α,21 - trihydroxy-16β - methyl - 4-pregnene-3,20-dione 21-acetate.

To a stirred solution of 110 mg. of 9α-fluoro-11β,17α,21-trihydroxy - 16β - methyl-4-pregnene - 3,20-dione 21-acetate in 5 ml. of methanol under nitrogen at 25° C. is added 1.00 ml. of 0.26 M methanolic sodium methoxide. After 15 minutes, 0.2 ml. of acetic acid in 1 ml. of water is added and the mixture concentrated nearly to dryness. The residue is taken up in ethyl acetate and the ethyl acetate solution is washed with water, dried over magnesium sulfate, and concentrated to dryness. Crystallization of the residue from ethyl acetate gives pure 9α-fluoro-11β,17α,21-trihydroxy-16β-methyl-4-pregnene-3,20-dione.

To a solution of 100 mg. of 9β,11β-epoxy-17α,21-dihydroxy-16β-methyl-4-pregnene-3,20-dione 21-acetate in 4 ml. of chloroform is added 5 ml. of concentrated hydrochloric acid. The two-phase mixture is stirred at 25° C. for 1 hour. Addition of water and chloroform extraction gives a crude crystalline product which is partly deacetylated. Treatment with 1 ml. of pyridine and 0.5 ml. of acetic anhydride at 25° C. for 18 hours followed by concentration in vacuo and crystallization of the residue from acetone-ether affords pure 9α-chloro-11β,17α,21-trihydroxy-16β-methyl-4-pregnene - 3,20 - dione 21-acetate. This compound is hydrolyzed by treatment with potassium bicarbonate in aqueous methanol to give 9α-chloro-11β,17α,21 - trihydroxy-16β - methyl-4-pregnene-3,20-dione.

To a stirred solution of 682 mg. of 17α,21-dihydroxy-16β-methyl-pregnane-3,11,20-trione 21-acetate in 20 ml. of chloroform and 2.25 ml. of acetic acid maintained at −20° C. is added dropwise one-half of a solution of 540 mg. of bromine in 2 ml. of chloroform and 3 ml. of acetic acid. The mixture is warmed to 0° C. and the remainder of the bromine added. Sodium acetate (0.4 g.) in 2 ml. of water is added followed by 20 mg. of sodium sulfite. The mixture is concentrated in vacuo to remove the chloroform and 20 ml. of water is added. The white powdery precipitate of 2,4-dibromo-17α,21-dihydroxy-16β-methyl-pregnane-3,11,20-trione 21-acetate is filtered, washed with water and dried in air. Yield: 920 mg., M.P. 122°–130° C. dec.

To a solution under nitrogen of 900 mg. of the 2,4-dibromo-17α,21-dihydroxy-16β-methyl - pregnane-3,11,20-trione 21-acetate in 5 ml. dimethyl formamide is added 200 mg. of sodium bromide. After 1 hour at 25° C., 1 ml. of dimethylaniline is added and the mixture maintained at 135° C. for 2½ hours. The mixture is cooled, added dropwise to dilute hydrochloric acid, and solid crude product filtered, washed with dilute hydrochloric acid, water and dried in air. Treatment with charcoal, followed by crystallization from acetone gives 17α,21-dihydroxy-16β-methyl-1,4-pregnadiene - 3,11,20-trione 21-acetate, M.P. 230°–233° C.

1.0 g. of 17α,21-dihydroxy-16β-methyl-1,4-pregnadiene-3,11,20-trione 21-acetate in 30 ml. of methanol is treated with 1 g. of potassium bicarbonate in 10 ml. of water under nitrogen at reflux temperature for 7 minutes. The mixture is cooled, neutralized with 1 ml. of acetic acid in 10 ml. of water, the methanol removed in vacuo and the product extracted into ethyl acetate. Removal of the ethyl acetate gives crystals (about 0.9 g.) of the desired 17α,21-dihydroxy-16β-methyl - 1,4 - pregnadiene-3,11,20-trione; M.P. 195°–200° C.

To 100 mg. of 11β,17α,21-trihydroxy - 16β - methyl-4-pregnene-3,20-dione 21-acetate in 5 ml. of acetic acid is added 50 mg. of selenium dioxide. The mixture is refluxed under nitrogen 18 hours, 50 mg. of selenium dioxide is added and the mixture refluxed an additional 24 hours. The mixture is filtered, and the filtrate taken to dryness. The residue is taken up in ethyl acetate and washed successively with aqueous sodium bicarbonate, ammonium sulfide, dilute ammonia water, water, dilute hydrochloric acid and water and dried over magnesium sulfate. It is then treated with activated charcoal and concentrated to dryness. Crystallization of the residue from acetone-ether gives pure 11β,17α,21-trihydroxy-16β-methyl-1,4-pregnadiene-3,20-dione 21-acetate. 100 mg. of 11β,17α,21-trihydroxy-16β-methyl-1,4-pregnadiene-3,20-dione 21 - acetate in 3 ml. of methanol is treated with 0.1 g. of potassium bicarbonate in 10 ml. of water under nitrogen at reflux temperature for 7 minutes. The mixture is cooled, neutralized with 0.1 ml. of acetic acid in 1 ml. of water, the methanol is evaporated in vacuo and the residual material is extracted with ethyl acetate. Evaporation of the ethyl acetate gives crystalline 11β,17α,21-trihydroxy-16β-methyl-1,4-pregnadiene-3,20-dione.

In a similar manner, 100 mg. of 9α-fluoro-11β,17α,21-trihydroxy-16β-methyl-4-pregnene-3,20-dione 21-acetate is treated with selenium dioxide to produce the corresponding 9α-fluoro - 11β,17α,21 - trihydroxy-16β-methyl-1,4-pregnadiene-3,20-dione 21-acetate. This compound is hydrolyzed with potassium bicarbonate in aqueous methanol in accordance with the procedure described in the preceding paragraph to give 9α-fluoro-11β,17α,21-trihydroxy-16β-methyl-1,4-pregnadiene-3,20-dione. Similarly, 100 mg. of 9α-chloro-11β,17α,21-trihydroxy-16β-methyl-4-pregnene-3,20-dione 21-acetate is treated with selenium dioxide to produce 9α-chloro-11β,17α,21-trihydroxy-16β-methyl-1,4-pregnadiene-3,20-dione 21-acetate, which is hydrolyzed by treatment with potassium bicarbonate in aqueous methanol to give 9α-chloro-11β,17α,21-trihydroxy-16β-methyl-1,4-pregnadiene-3,20-dione.

A solution of 100 mg. of 9α-fluoro-11β,17α,21-trihydroxy-16β-methyl-1,4-pregnadiene-3,20-dione 21-acetate in 1 ml. of pyridine is added to the complex formed by the addition of 100 mg. of chromium trioxide to 1 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulphuric acid at about 0° C., and then with water until neutral. The organic solvent layer is then dried, the solvents are evaporated therefrom in vacuo, and the residual crystalline material is purified by crystallization from ethyl acetate-ether to give 9α-fluoro-17α,21-dihydroxy-16β-methyl-1,4-pregnadiene-3,11,20-trione 21-acetate. This compound is hydrolyzed by treatment with potassium bicarbonate in aqueous methanol to form 9α-fluoro-17α,21-dihydroxy-16β-methyl-1,4-pregnadiene-3,11,20-trione.

In a similar manner, 9α-chloro-11β,17α,21-trihydroxy-16β-methyl-1,4-pregnadiene-3,20-dione 21-acetate is reacted with chromium trioxidepyridine complex to give 9α-chloro - 17α,21 - dihydroxy-16β-methyl-1,4-pregnadiene-3,11,20-trione 21-acetate, which is hydrolyzed by treatment with potassium bicarbonate in aqueous methanol to give 9α-chloro-17α,21-dihydroxy-16β-methyl-1,4-pregnadiene-3,11,20-trione.

Similarly, 9α-fluoro-11β,17α,21-trihydroxy-16β-methyl-4-pregnene-3,20-dione 21-acetate is reacted with chromium trioxide-pyridine complex to form 9α-fluoro-17α,21-dihydroxy-16β-methyl - 4-pregnene-3,11,20-trione 21-acetate which is hydrolyzed by treatment with potassium bicarbonate in aqueous methanol to produce 9α-fluoro-17α,21-dihydroxy-16β-methyl-4-pregnene-3,11,20-trione.

Similarly, 9α-chloro-11β,17α,21-trihydroxy-16β-methyl-4-pregnene-3,20-dione 21-acetate is reacted with chromium trioxide-pyridine complex to form 9α-chloro-17α, 21 - dihydroxy-16β-methyl-4-pregnene-3,11,20-trione 21-acetate which is hydrolyzed by treatment with potassium bicarbonate in aqueous methanol to produce 9α-chloro-17α,21-dihydroxy-16β-methyl-4-pregnene-3,11,20-trione.

10 grams of 17α,21-dihydroxy-16α-methyl-4-pregnene-3,11,20-trione which can be prepared as described hereinabove, are dissolved in 400 cc. of chloroform. To this solution is added a mixture of 100 cc. of concentrated aqueous hydrochloric acid and 100 cc. of 37% aqueous formaldehyde solution. The resulting mixture is stirred for a period of approximately 3 days at room temperature. The chloroform layer is separated, washed with sodium bicarbonate solution until neutral, then with water, dried over anhydrous sodium sulfate, and evaporated to dryness in vacuo. The residual crude material is purified by crystallization from a mixture of methylene chloride and methanol to give 17α,20,20,21-bismethylenedioxy-16α-methyl-4-pregnene-3,11-dione.

10 grams of 17α,20,20,21-bismethylenedioxy-16α-methyl-4-pregnene-3,11-dione are dissolved in 500 cc. of benzene, to the solution is added 25 cc. ethylene glycol and 1 gram of p-toluenesulfonic acid, and the resulting mixture is heated under reflux for a period of approximately 15 hours. The reaction solution is cooled, washed with aqueous sodium bicarbonate solution, dried over anhydrous sodium sulfate, and evaporated to dryness in vacuo. The residual crude material is absorbed from its solution in benzene on 250 g. of acid-washed alumina, and the resulting adsorbate is eluted utilizing mixtures of ether-petroleum ether to give 3-ethylenedioxy-17α, 20,20,21-bismethylenedioxy-16α-methyl-5-pregnene-11-one.

A mixture of 10 grams of 3-ethylenedioxy-17α, 20,20, 21-bismethylenedioxy-16α-methyl-5-pregnene-11-one, 4.3 g. perbenzoic acid and 230 cc. benzene is allowed to stand at room temperature for a period of about 2 days. A portion of the epoxide product, which precipitates, is separated from the reaction solution by decantation, and the decanted solution is washed with saturated aqueous sodium bicarbonate solution and then dried over anhydrous sodium sulfate. The dried solution is then evaporated in vacuo, and the residual epoxide product is combined with the epoxide product originally separated from the reaction mixture.

The mixed epoxides are dissolved in 200 cc. of substantially anhydrous formic acid and the resulting solution is allowed to stand at room temperature for a period of about 2½ hours. The reaction solution is poured into water, and the aqueous mixture is extracted with chloroform. The chloroform solution is washed with saturated aqueous sodium bicarbonate solution, dried over anhydrous sodium sulfate, and evaporated in vacuo to give a mixture of 17α, 20,20,21-bismethylenedioxy-5-hydroxy-16α-methyl-6-formyloxy-pregnane-3,11-dione and 17,20,20,21 - bismethylenedioxy - 6-hydroxy-16α-methyl-5-formyloxy-pregnane-3,11-dione.

This mixture of 5-formyloxy and 6-formyloxy derivatives is dissolved in about 850 cc. of methanol, to this solution is added a solution containing about 17 grams of potassium hydroxide in 80 cc. of water, and the resulting mixture is heated under reflux in a nitrogen atmosphere for a period of approximately ½ hour. The reaction solution is cooled, neutralized with about 23 cc. of acetic acid and evaporated in vacuo to a small volume. The concentrated solution is poured into water and the aqueous mixture is extracted with chloroform. The chloroform extract is washed with aqueous sodium bicarbonate solution, dried over anhydrous sodium sulfate, and evaporated to dryness in vacuo. The residual material is crystallized from methanol to give 17α, 20,20,21-bismethylenedioxy-16α-methyl-allopregnane-3,6,11-trione.

A solution containing about 5 grams of 17α,20,20,21-bismethylenedioxy - 16α - methyl - allopregnene - 3,6,11-trione and 0.1 g. of p-toluenesulfonic acid in 120 cc. butanone dioxulane is heated under reflux for a period of about 10 minutes. The reaction solution is cooled to about 0–5° C., diluted with chloroform, and the resulting solution is washed with aqueous sodium bicarbonate solution and dried over anhydrous sodium sulfate. The resulting dried solution is evaporated to dryness in vacuo, and the residual material is slurried with ether, recovered by filtration and then dried to give 3-ethylenedioxy-17α,20,20,21 - bismethylenedioxy - 16α - methyl-allopregnane-6,11-dione.

A solution containing about 5 grams of 3-ethylenedioxy-17α,20,20,21-bismethylenedioxy-16α-methyl-allopregnane-6,11-dione in 70 cc. of benzene is added, with stirring over a period of approximately 10 minutes, to an ethereal solution containing the methyl magnesium iodide, prepared from 5 cc. of methyl iodide and 0.5 gram of magnesium turnings, dissolved in 50 cc. of ether. The reaction mixture is allowed to stir for an additional ½ hour period, and the resulting solution is decomposed with 70 cc. of water. About 170 cc. of benzene is added to the aqueous mixture and the layers are separated. The aqueous layer is extracted with two 100 cc.-portions of chloroform, and the organic layers are combined, dried over anhydrous sodium sulfate, and evaporated to dryness in vacuo to give 3 - ethylenedioxy - 17α,20,20,21-bismethylenedioxy-6β-hydroxy-6α,16α-dimethylallopregnane-11-one.

A solution containing 5.5 cc. of freshly distilled thionyl chloride in 26 cc. of cold anhydrous pyridine is added dropwise, with stirring, to a solution of 5.0 g. of 3-ethylenedioxy-17α,20,20,21 - bismethylenedioxy-6β - hydroxy-6α,16α-dimethyl-allopregnene-11-one in 32 cc. of anhydrous pyridine, while maintaining the temperature of the reaction mixture at approximately 40° C. The reaction solution is stirred for an additional 30 minute period following the addition of the thionyl chloride reagent, and the reaction mixture is then cooled to about 0–5° C. and poured into 180 cc. ice water. The aqueous mixture is extracted with chloroform, and the chloroform extract is neutralized, dried over anhydrous sodium sulfate, and evaporated to dryness in vacuo. The residual material, dissolved in benzene, is chromatographed on 150 grams of acid-washed alumina; elution of the resulting adsorbate with mixtures of petroleum ether and ether gives 3-ethylenedioxy - 17α, 20,20,21 - bismethylenedioxy - 6,16α - dimethyl-5-pregnene-11-one.

A solution containing about 5 grams of 3-ethylenedioxy - 17α,20,20,21 - bismethylenedioxy - 6α,16α - dimethyl-5-pregnene-11-one, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21 - bismethylenedioxy - 6α,16α - dimethyl - 4-pregnene-3,11-dione.

About 0.1 gram of 17α,20,20,21-bismethylenedioxy-6α,17α-dimethyl-4-pregnene-3,11-dione is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 17α,21 - dihydroxy - 6α,16α - dimethyl - 4 - pregnene-3,11,20-trione. The material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. poured into ice water. The aqueous suspension is extracted with chloroform, and the chloroform extract is washed with aqueous sodium bicarbonate solution, dried over anhydrous soduim sulfate, and evaporated to dryness in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 17α,21 - dihydroxy - 6α - dimethyl - 4-pregnene-3,11,20-triene 21-acetate.

In accordance with the foregoing procedures, but starting with 17α,21-dihydroxy-16β-methyl-4-pregnene-3,11,20-triene, there are obtained the corresponding 17α,21-dihydroxy-6α,16β-dimethyl-4-pregnene-3,11,20-trione and its 21-acetate.

To a solution of 100 mg. of 17α,21-dihydroxy-6α,16α-dimethyl-4-pregnene-3,11,20-triene 21-acetate, in 6 ml. t-butanol, and 0.01 ml. of glacial acetic acid is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated using partition chromatography on diatomaceous silica (Super-Cel) to give 17α,21-dihydroxy-6α,16α-dimethyl-1,4-pregnadiene-3,11,20-triene 21 - acetate. 40 mg. of 17α,21-dihydroxy-6α,16α - dimethyl - 1,4 - pregnadiene-3,11,20-triene 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, then benzene is evaporated in vacuo, and the residual material is purified by crystallization to give 17α,21-dihydroxy-6α,16α-dimethyl-1,4-pregnadiene-3,11,20-triene.

Similarily, in accordance with the foregoing procedure, but starting with 17α,21-dihydroxy-6α,16β-dimethyl-4-pregnene-3,11,20-triene 21-acetate, there are obtained the corresponding 17α,21-dihydroxy - 6α,16β - dimethyl - 1,4-pregnadiene-3,11,20-triene, and its 21-acetate.

About 5 grams of 3-ethylenedioxy-17α,20,20,21-bismethylenedioxy-6,16α-dimethyl-5-pregnene-11-one, which can be prepared as described hereinabove, is dissolved in about 85 cc. of benzene. This solution is added to a stirred suspension containing 5 grams of lithium aluminum hydride in one liter of anhydrous ether, and the resulting suspension is heated under reflux for a period of about 4 hours. The reaction mixture is allowed to cool to about room temperature, and approximately 33 cc. of ethyl acetate is added to destroy excess lithium aluminum hydride. The resulting mixture is admixed with about 100 cc. of water, the ethereal layer is decanted, and the aqueous layer, diluted with an additional 200 cc. of water, is extracted with chloroform. The ether and chloroform layers are combined, and the combined organic layers are dried over anhydrous sodium sulfate and evaporated to dryness in vacuo. The residual material, dissolved in about 250 cc. of benzene, is adsorbed on about 150 grams of acid-washed alumina, and the resulting adsorbate is eluted utilizing mixtures of petroleum ether-ether. This eluate is evaporated in vacuo, and the residual material is purified by crystallization from ether to give 3-ethylenedioxy-17α,20,20,21-bis-methylenedioxy - 11β - hydroxy - 6,16α-dimethyl-5-pregnene.

A solution containing about 5 grams of 3-ethylenedioxy - 17α,20,20,21 - bismethylenedioxy - 11β,hydroxy-6,16α-dimethyl-5-pregnene, 500 cc. of anhydrous acetone and about 0.5 g. of p-toluenesulfonic acid monohydrate is allowed to stand for a period of about 15 hours. The reaction solution is poured into water, and the aqueous mixture is extracted with chloroform. The chloroform solution is washed with aqueous sodium bicarbonate solution, dried over anhydrous sodium sulfate, and the chloroform solution is evaporated to dryness in vacuo. The residual material is crystallized from benzene to give 17α,20,20,21 - bismethylenedioxy - 11β - hydroxy - 6α,16α-dimethyl-4-pregnene-3-one.

About 0.1 gram of 17α,20,20,21-bismethylene-dioxy-11β - hydroxy - 6α,16α - dimethyl - 4 - pregnene - 3 - one is suspended in 18 cc. of 50% aqueous acetic acid, and the suspension is carefully purged with nitrogen, following which the suspension is heated on a steam bath under nitrogen for a period of about 8 hours and then allowed to stand at room temperature for an additional period of 15 hours. The reaction solution is evaporated to dryness in vacuo to give 11β,17α,21-trihydroxy 6α,16α-dimethyl-4-pregnene 3,20-dione. This material is dissolved in 20 cc. of chloroform, and the chloroform solution evaporated to dryness in vacuo. To the residual dry material is added 1 cc. of pyridine and 1 cc. of acetic anhydride, and the resulting mixture is heated on a steam bath for a period of about 15 minutes. The reaction solution is cooled to about 0–5° C. and poured into ice water. The aqueous suspension is extracted with chloroform, and the chloroform extract is washed with aqueous sodium bicarbonate solution, dried over anhydrous sodium sulfate, and evaporated in vacuo. The residual material, dissolved in 30 cc. benzene, is adsorbed on 5 grams of acid-washed alumina; the adsorbate is washed with 50 cc. ether. The adsorbate is then eluted with 250 cc. of a 5:5 mixture of ether-chloroform, and then with 50 cc. of a 3:7 mixture of ether-chloroform. The eluates are evaporated in vacuo, and the residual material is crystallized from methanol to give 11β,17α,21-trihydroxy-6α,16α-dimethyl-4-pregnene-3,20-dione 21-acetate.

In accordance with the foregoing procedure, but starting with 3-ethylenedioxy-17α,20,20,21-bismethylenedioxy-6,16β-dimethyl-5-pregnene-11-one (which is obtained as an intermediate in the preparation of 17α,21-dihydroxy-6α,16β - dimethyl - 4 - pregnene - 3,11,20 - trione 21-acetate herein described above) there are obtained the corresponding 11β,17α,21 - trihydroxy - 6α,16β - dimethyl-4-pregnene-3,20-dione and its 21-acetate.

To a solution of 100 mg. of 11β,17α,21-trihydroxy-6α,16α-dimethyl-4-pregnene-3,20-dione 21-acetate, in 6 ml. t-butanol, and 0.01 ml. of glacial acetic acid, is added 70 mg. of selenium dioxide. The mixture is heated under reflux in a nitrogen atmosphere for a period of about 6 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged and the clear benzene solution is evaporated in vacuo. The residual material thus obtained is separated using partition chromatography on diatomaceous silica (Super-Cel) to give 11β,17α,21-trihydroxy - 6α,16α - dimethyl - 1,4 - pregnadiene - 3,20-dione 21-acetate. 45 mg. of 11β,17α,21-trihydroxy 6α,16α-dimethyl - 1,4 - pregnadiene - 3,20 - dione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, then benzene is evaporated in vacuo and the residual material is purified by crystallization to give 11β,17α,21 - trihydroxy - 6α,16α - dimethyl - 1,4 - pregnadiene-3,20-dione.

Similarly, in accordance with the foregoing procedures but starting with 11β,17α,21-trihydroxy-6α,16β-dimethyl-4-pregnene-3,20-dione 21-acetate, there are obtained the corresponding 11β,17α,21 - trihydroxy - 6α,16β - dimethyl-1,4-pregnadiene-3,20-dione, and its 21-acetate.

To a cooled solution of 436 mg. of 11β,17α,21-trihydroxy - 6α,16α - dimethyl - 4 - pregnene - 3,20 - dione 21-acetate (which can be prepared as described hereinabove) in 2.5 cc. dimethyl formamide and 2.0 ml. of dry pyridine is added 1.0 ml. of methane sulfonyl chloride, while maintaining the temperature below 0° C. The resulting mixture is allowed to warm to room temperature, at which point a precipitate appears; the resulting mixture is then heated to a temperature of about 70°–100° C. for a period of about 10 minutes. About 15 ml. of water is added slowly to the reaction mixture, with stirring, and the aqueous mixture is extracted with ethyl acetate. The combined ethyl acetate extracts are washed with water, then with dilute aqueous hydrochloric acid solution, again with water, and then with a dilute aqueous sodium bicarbonate solution. The washed ethyl acetate solution is dried, and the solvent is evaporated in vacuo; the residual material is triturated with ether, and the crystalline material is recrystallized to give 17α,21-dihydroxy-6α,16α - dimethyl - 4,9(11) - pregnadiene - 3,20-dione 21-acetate. A suspension of 330 mg. of 17α,21-dihydroxy-6α,16α - dimethyl - 4,9(11) - pregnadiene - 3,20 - dione 21-acetate and 1.8 g. of N-bromosuccinimide in a mixture of 50 ml. of dioxane and 10 ml. of water is cooled to 10° C. Then with stirring, 10 ml. of cold 1.0 N aqueous perchloric acid is added. The temperature of the reaction mixture is allowed to rise to 15° C. and is maintained at this point for about two and one-half hours during which time the solid material slowly dissolves. The resulting yellow solution is treated with 1.0 ml. of allyl alcohol to discharge the color and the remaining N-bromo-succinimide, and the resulting solution is evaporated to a small volume in vacuo. The concentrated solution is diluted with water, and the aqueous mixture is extracted with ethyl acetate. The ethyl acetate extracts are washed, dried and evaporated to dryness, and the residual material is crystallized from ethyl acetate-ether to give 9α-bromo-11β,17α,21 - trihydroxy - 6α,16α - dimethyl - 4 - pregnene-3,20-dione 21-acetate.

A solution of 210 mg. of 9α-bromo-11β,17α,21-trihydroxy - 6α,16α - dimethyl - 4 - pregnene - 3,20 - dione 21-acetate and 240 mg. of potassium acetate in 10 ml. of absolute ethanol is heated under reflux for two hours. The reaction mixture is cooled to room temperature, evaporated in vacuo to a small volume, and diluted with water. The concentrated aqueous mixture is extracted with three portions of ethyl acetate, and the combined ethyl acetate extracts are washed with water, dried, and evaporated to dryness in vacuo. The residual material is crystallized from ethyl acetate-ether to give 9β,11β-epoxy-17α,21 - dihydroxy - 6α,16α - dimethyl - 4 - pregnene-3,20-dione 21-acetate.

To a solution of 83 mg. of anhydrous hydrogen fluoride in 4.7 ml. of ice-cold alcohol-free chloroform is added an ice-cold solution of 416 mg. of 9β,11β-epoxy-17α,21 - dihydroxy - 6α,16α - dimethyl - 4 - pregnene-3,20-dione 21-acetate. The solution is mixed thoroughly and maintained at 0° C. for two hours, at the end of which time 13.0 ml. of ice-cold 20% aqueous sodium acetate is added, and the resulting mixture agitated vigorously. The layers are separated, and the chloroform layer is washed with water until free of acid, dried, and the chloroform evaporated in vacuo. The residual material is crystallized from acetone-petroleum ether to give 9α-fluoro - 11β,17α,21 - trihydroxy - 6α,16α - dimethyl - 4-pregnene-3,20-dione 21-acetate. Fifty milligrams of 9α-fluoro - 11β,17α,21 - trihydroxy - 6α,16α - dimethyl - 4-pregnene-3,20-dione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 9α-fluoro-11β,17α,21-trihydroxy-6α,16α-dimethyl-3,20-dione.

Similarly, when hydrogen chloride is substituted for hydrogen fluoride in the reaction with 9β,11β-epoxy-17α,21 - dihydroxy - 6α,16α - dimethyl - 4 - pregnene - 3,20-dione 21-acetate there is obtained the corresponding 9α-chloro - 11β,17α,21 - trihydroxy - 6α,16α - dimethyl - 4-pregnene-3,20-dione.

In accordance with the foregoing procedures when 11β,17α,21 - trihydroxy - 6α,16β - dimethyl - 4 - pregnene-3,20-dione 21-acetate is employed as the starting material, there is obtained the corresponding 9α-fluoro-11β,17α,21-trihydroxy - 6α,16β - dimethyl - 4 - pregnene - 3,20 - dione or 9α - chloro - 11β,17α,21 - trihydroxy - 6α,16β - dimethyl-4-pregnene-3,20-dione.

To a solution of 100 mg. of 9α-fluoro-11β,17α,21-trihydroxy - 6α,16α - dimethyl - 4 - pregnene - 3,20 - dione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous sodium sulfate. The benzene solution is stirred with mercury overnight, then centrifuged, and the clear benzene solution is evaporated in vacuo. The residual material thus obtained is separated, using partition chromatography on diatomaceous silica (Super-Cel), to give 9α-fluoro-11β,17α,21-trihydroxy-6α,16α-dimethyl-1,4-pregnadiene-3,20-dione 21-acetate.

This material is hydrolyzed using 1 N methanolic potassium hydroxide in benzene as described above for the hydrolysis of 9α-fluoro-11β,17α,21-trihydroxy-6α,16α-dimethyl-4-pregnene-3,20-dione 21-acetate to give 9α-fluoro-11β,17α,21 - trihydroxy - 6α,16α - dimethyl - 1,4 - pregnadiene-3,20-dione.

Starting with 9α-chloro-11β,17α,21-trihydroxy-6α,16α-dimethyl-4-pregnene-3,20-dione 21-acetate, there are obtained in accordance with the foregoing procedures the corresponding 9α - chloro-11β,17α,21-trihydroxy-6α,16α-dimethyl-1,4-pregnadiene-3,20-dione, and its 21-acetate.

Similarly, starting with 9α - bromo - 11β,17α,21 - trihydroxy - 6α,16α-dimethyl-4-pregnene-3,20-dione 21-acetate obtained as an intermediate in the preparation of 9α-fluoro-11β,17α,21-trihydroxy-6α,16α-dimethyl - 4 - pregnene-3,20-dione herein described above, there are obtained the corresponding 9α - bromo - 11β,17α,21 - trihydroxy-6α, 16α-dimethyl-1,4-pregnadiene-3,20-dione, and its 21-acetate.

In accordance with the foregoing procedures, but starting with 9α-halo-11β,17α,21-trihydroxy-6α,16α-dimethyl-4-pregnene-3,20-dione 21-acetate there are obtained the corresponding 9α-holo-11β,17α,21-trihydroxy-6α,16β-dimethyl-1,4-pregnadiene-3,20-diones such as for example 9α-fluoro-11β,17α,21 - trihydroxy-6α,16β-dimethyl-1,4-pregnadiene-3,20-dione, 9α - chloro-11β,17α,21-trihydroxy-6α,16β-dimethyl-1,4-pregnadiene-3,20-dione and 9α-bromo-11β,17α,21-trihydroxy-6α,16β - dimethyl - 1,4-pregnadiene-3,20-dione, and their 21-acetates.

A solution of 400 mg. of 9α-fluoro-11β,17α,21-trihydroxy-6α,16α-dimethyl-4-pregnene-3,20-dione 21-acetate in 4 ml. of pyridine is added to the complex formed by the addition of 400 mg. of chromium trixode to a 4 ml. of pyridine. The mixture is swirled until thoroughly mixed and then allowed to stand at room temperature overnight. The reacton mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization to give 9α-fluoro-17α,21-dihydroxy-6α,16α-dimethyl-4-pregnene - 3,11,20-trione 21-acetate. Fifty miligrams of 9α-fluoro-17α,21-dihydroxy-6α,16α-dimethyl-4-pregnene - 3,11,20 - trione 21-acetate is dissolved in a mixture of 1.0 cc. of benzene and 1.0 cc. of 1 N methanolic potassium hydroxide, and the solution is allowed to stand at room temperature for a period of about 10 minutes. The solution is then acidified with acetic acid, the benzene is evaporated in vacuo, and the residual material is purified by crystallization to give 9α-fluoro-17α,21-dihydroxy-6α,16α-dimethyl-4-pregnene-3,11,20-trione.

Similarly, starting with 9α - chloro - 11β,17α,21 - trihydroxy-6α,16α-dimethyl-4-pregnene-3,20-dione 21-acetate, there are obtained in accordance with the foregoing procedures the corresponding 9α-chloro-17α,21-dihydroxy-6α,16α-dimethyl-4-pregnene-3,11,20-trione, and its 21-acetate.

Similarly, but starting with 9α-bromo-11β,17α,21-trihydroxy-6α,16α-dimethyl-4-pregnene-3,20-dione 21 - acetate obtained as an intermediate in the preparation of 9α-fluoro - 11β,17α,21 - trihydroxy-6α,16α-dimethyl-4-pregnene-3,20-dione herein described above, there are obtained the corresponding 9α-bromo-17α,21-dihydroxy-6α,16α-dimethyl-4-pregnene-3,11,20-trione, and its 21-acetate.

In accordance with the foregoing procedures, but starting with 9α-halo-11β,17α,21-trihydroxy-6α,16β-dimethyl-4-pregnene-3,20-dione 21-acetate, there are obtained the corresponding 9α - halo-17α,21-dihydroxy-6α,16β-dimethyl-4-pregnene-3,11,20-triones, such as for example, 9α-fluoro - 17α,21-dihydroxy-6α,16β-dimethyl-4-pregnene-3, 11,20-trione, 9α-chloro-17α,21-dihydroxy-6α,16β-dimethyl-4-pregnene-3,11,20-trione, and 9α-bromo-17α,21-dihydroxy - 6α,16β - dimethyl-4-pregnene-3,11,20-trione, and their 21-acetates.

To a solution of 100 mg. of 9α-fluoro-17α,21-dihydroxy-6α,16α-dimethyl-4-pregnene-3,11,20-trione 21-acetate, in 6 ml. t-butanol, and 0.01 ml. of glacial acetic acid is added 70 mg. of selenium dioxide. The mixture is heated under reflux in a nitrogen atmosphere for a period of about 60 hours. The reaction solution is filtered and evaporated in vacuo. The residual material is dissolved in benzene, and the benzene solution is washed with an aqueous sodium bicarbonate solution and dried over anhydrous solution sulfate. The benzene solution is stirred with mercury overnight, then centrifuged, and the clear benzene solution is evaporated in vacuo. The residual material thus obtained is separated using partition chromatography on diatomaceous silica (Super-Cel) to give 9α-fluoro - 17α, 21-dihydroxy-6α,16α-dimethyl-1,4-pregnadiene-3,11,20-trione 21 acetate. This material is hydrolyzed using 1 N methanolic potassium hydroxide in benzene as described hereinabove for the hydrolysis of 9α-fluoro-17α,21-dihydroxy-6α-dimethyl-4-pregnene-3,11,20-trione 21-acetate to give 9α-fluoro-17α,21-dihydroxy-6α,16-dimethyl-1,4-pregnadiene-3,11,20-trione.

Similarly, starting with 9α-chloro-17α,21-dihydroxy-6α,16α-dimethyl-4-pregnene-3,11,20-trione 21-acetate there are obtained in accordance with the foregoing procedures the corresponding 9α-chloro-17α,21-dihydroxy-6α-dimethyl-1,4-pregnadiene-3,11,20-trione, and its 21-acetate.

Similarly, but starting with 9α-bromo-17α,21-dihydroxy-6α,16α-dimethyl-4-pregnane-3,11,20-trione 21-acetate there are obtained the corresponding 9α-bromo-17α,21-dihydroxy-6α,16α-dimethyl-1,4-pregnadiene-3,11,20-trione, and its 21-acetate.

In accordance with the foregoing procedures but starting with 9α-halo-17α,21-dihydroxy-6α,16β-dimethyl-4-pregnene-3,11,20-trione 21-acetate there are obtained the corresponding 9α-halo-17α,21-dihydroxy-6α,16β-dimethyl-1,4-pregnadienes-3,11,20-triones, such as for example, 9α-fluoro-17α,21-dihydroxy-6α,16β-dimethyl-1,4-pregnadiene-3,11,20-trione, 9α-chloro-17α21-dihydroxy-6α,16β-dimethyl-1,4-pregnadiene-3,11,20-trione and 9α-bromo-17α,21-dihydroxy-6α,16β-dimethyl-1,4-pregnadiene-3,11,20-trione, and their 21-acetates.

A suspension containing 300 mg. of 17α,21-dihydroxy-6α,16α-dimethyl-4-pregnene-3,11,20-trione 21-acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 17α,21-dihydroxy-6,16α-dimethyl-4,6-pregnadiene-3,11,20-trione 21-acetate. This product is then hydrolyzed by treatment with a solution of potassium bicarbonate in aqueous methanol to form 17α,21-dihydroxy-6,16α-dimethyl-4,6-pregnadiene-3,11,20-trione.

In accordance with the above procedure but starting with 17α,21-dihydroxy-6α,16β-dimethyl-4-pregnene-3,11,20-trione 21-acetate there are obtained 17α,21-dihydroxy-6,16β-dimethyl-4,6-pregnadiene-3,11,20-trione and its 21-acetate.

In accordance with the above procedure but starting with 11β,17α,21-trihydroxy-6α,16α-dimethyl-4-pregnene-3,20-dione 21-acetate there is obtained 11β,17α,21-trihydroxy-6,16α-dimethyl-4,6-pregnadiene-3,20-dione and its 21-acetate.

In accordance with the above procedure but starting with 11β,17α,21-trihydroxy-6α,16β-dimethyl-4-pregnene-3,20-dione 21-acetate there is obtained 11β,17α,21-trihydroxy-6,16β-dimethyl-4,6-pregnadiene-3,20-dione and its 21-acetate.

A suspension containing 300 mg. of 9α-fluoro-11β,17α,21-trihydroxy-6α,16α-dimethyl-4-pregnene-3,20-dione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentrated in vacuo. The crude material dissolved in benzene is chromatographed on 15 g. of acid-washed alumina. Elution with chloroform:ether 2:8 affords 9α-fluoro-11β-17α,21-trihydroxy-6,16α-dimethyl-4,6-pregnadiene-3,20-dione 21-acetate. This product is then hydrolyzed by treatment with a solution of potassium bicarbonate in aqueous methanol to form 9α-fluoro-11β,17α,21-trihydroxy-6,16α-dimethyl-pregnadiene-3,20-dione.

In accordance with the above procedure but starting with 9α-chloro-11β,17α,21-trihydroxy-6α,16α-dimethyl-4-pregnene-3,20-dione 21-acetate, there are obtained the corresponding 9α-chloro-11β,17α,21-trihydroxy-6α,16α-dimethyl-4,6-pregnadiene-3,20-dione and its 21-acetate.

In accordance with the above procedure but starting with 9α-bromo-11β,17α,21-trihydroxy-6α,16α-dimethyl-4-pregnene-3,20-dione 21-acetate, there are obtained the corresponding 9α-bromo-11β,17α,21-trihydroxy-6,16α-dimethyl-4,6-pregnadiene-3,20-dione and its 21-acetate.

Similarly, in accordance with the above procedure but starting with 9α-fluoro-11β,17α,21-trihydroxy-6α,16α-dimethyl-4-pregnene-3,20-dione 21-acetate, there is obtained the corresponding 9α-fluoro-11β,17α,21-trihydroxy-6,16α-dimethyl-4,6-pregnadiene-3,20-dione and its 21-acetate.

Similarly, in accordance with the above procedure but starting with 9α-chloro-11β,17α,21-trihydroxy-6α,16β-dimethyl-4-pregnene-3,20-dione 21-acetate, there is obtained the corresponding 9α-chloro-11β,17α,21-trihydroxy-6,16β-dimethyl-4,6-pregnadiene-3,20-dione and its 21-acetate.

Similarly, in accordance with the above procedure but starting with 9α-bromo-11β,17α,21-trihydroxy-6α,16β-dimethyl-4-pregnene-3,20-dione 21-acetate, there is obtained the corresponding 9α-bromo-11β,17α,21-trihydroxy-6,16β-dimethyl-4,6-pregnadiene-3,20-dione and its 21-acetate.

A suspension containing 300 mg. of 9α-fluoro-17α,21-dihydroxy-6α,16α-dimethyl-4-pregnene-3,11,20-trione 21-acetate, 700 mg. of chloranil, 8.3 ml. of ethyl acetate and 1.7 ml. of acetic acid is refluxed for 17 hours under nitrogen. The reaction mixture is diluted with 40 ml. of ethyl acetate and filtered. The filtrate is washed sequentially with two 20 ml. portions of ice cold 10% aqueous sodium bisulfite solution, three 20 ml. portions of ice cold 5% aqueous potassium hydroxide solution and finally washed to neutrality with several 20 ml. portions of ice water. The aqueous washes are re-extracted with 50 ml. of ethyl acetate and treated as above. The combined organic phase is dried over sodium sulfate and concentarted in vacuo. The crude material dissolved in benzene is chromatographed on 15 g. of acid-washed alumina. Elution with chloroform:ether 2:8 affords 9α-fluoro-17α,21-dihydroxy-6,16α-dimethyl-4,6-pregnadiene-3,11,20-trione 21-acetate. This product is then hydrolized by treatment with a solution of potassium bicarbonate in aqueous methanol to form 9α-fluoro-17α,21-dihydroxy-6,16α-dimethyl-4,6-pregnadiene-3,11,20-trione.

In accordance with the above procedure but starting with 9α-chloro-17α,21-dihydroxy-6α,16α-dimethyl-4-pregnene-3,11,20-trione 21-acetate there is obtained the corresponding 9α-chloro-17α,21-dihydroxy-6,16α-dimethyl-4,6-pregnadiene-3,11,20-trione and its 21-acetate.

In accordance with the above procedure, but starting with a 9α-bromo-17α,21-dihydroxy-6α,16α-dimethyl-4-pregnene-3,11,20-trione 21-acetate there is obtained the corresponding 9α-bromo-17α,21-dihydroxy-6,16α-dimethyl-4,6-pregnadiene-3,11,20-trione and its 21-acetate.

Similarly, in accordance with the above procedure but starting with 9α-fluoro-17α,21-dihydroxy-6α,16α-dimethyl-4-pregnene-3,11,20-trione 21-acetate, there are obtained the corresponding 9α-fluoro-17α,21-dihydroxy-6,16α-dimethyl-4,6-pregnadiene-3,11,20-trione and its 21-acetate.

Similarly, in accordance with the above procedure but starting with 9α-fluoro-17α,21-dihydroxy-6α,16β-dimethyl-4-pregnene-3,11,20-trione 21-acetate, there are obtained the corresponding 9α-fluoro-17α,21-dihydroxy-6,16β-dimethyl-4,6-pregnadiene-3,11,20-trione and its 21-acetate.

Similarly, in accordance with the above procedure but starting with 9α-bromo-17α,21-dihydroxy-6α,16β-dimethyl- 4-pregnene-3,11,20-trione 21-acetate, there are obtained the corresponding 9α-bromo-17α,21-dihydroxy-6,16β-dimethyl-4,6-pregnadiene-3,11,20-trione and its 21-acetate.

To a solution of 200 mg. of 17α,21-dihydroxy-6,16α-dimethyl-4,6-pregnadiene-3,11,20-trione 21-acetate in 0.16 ml. of acetic acid and 12 ml. of t-amyl alcohol is added 120 mg. of selenium dioxide and 2 drops of mercury. The mixture is refluxed under nitrogen overnight. The solution is filtered, washed with sodium bicarbonate, dried, and concentrated. This product is chromatographed on acid-washed alumina. The adsorbate is eluted with mixtures of chloroform and ether, increasingly rich in cholorform. The eluates are combined, evaporated to dryness and the residual material recrystallized from ethyl acetate to give 17α,21-dihydroxy - 6,16α-dimethyl - 1,4,6-pregnatriene-3,11,20-trione 21-acetate. This product is then hydrolyzed by treatment with a solution of potassium bicarbonate in aqueous methanol to form 17α,21-dihydroxy - 6,16α-dimethyl-1,4,6-pregnatriene-3,11,20-trione.

In accordance with the above procedure but starting with 17α,21-dihydroxy - 6,16β-dimethyl-4,6-pregnadiene-3,11,20-trione 21-acetate there are obtained 17α,21-dihydroxy-6,16β-dimethyl - 1,4,6-pregnatriene-3,11,20-trione and its 21-acetate.

Similarly, when 11β,17α,21-trihydroxy-6,16α-dimethyl-4,6-pregnadiene-3,20-dione 21-acetate is used as starting material in the foregoing reaction with selenium dioxide and the product hydrolyzed with aqueous methanolic potassium bicarbonate solution, there are obtained 11β,17α,21-trihydroxy-6,16α-dimethyl - 1,4,6-pregnatriene-3,20-dione and its 21-acetate. Where the starting material in this procedure is 11β,17α,21-trihydroxy - 6,16β-dimethyl-4,6-pregnadiene-3,20-dione 21-acetate, there are obtained 11β,17α,21-trihydroxy-6,16β-dimethyl - 1,4,6-pregnatriene-3,20-dione and its 21-acetate.

Where the starting material in the foregoing reaction with selenium dioxide followed by hydrolysis with aqueous methanolic potassium bicarbonate is 9α-fluoro-11β,17α,21-trihydroxy-6,16α-dimethyl-4,6-pregnadiene-3,30-dione 21-acetate, the products obtained are 9α-fluoro-11β,17α,21-trihydroxy-6,16α-dimethyl - 1,4,6-pregnatriene-3,20-dione and its 21-acetate.

In accordance with the above procedure but starting with 9α-chloro-11β,17α,21-trihydroxy-6,16α-dimethyl-4,6-pregnadiene-3,20-dione 21-acetate there are obtained 9α-chloro - 11β,17α,21 - trihydroxy - 6,16α - dimethyl-1,4,6-pregnadiene-3,20-dione and its 21-acetate.

Similarly, in accordance with the above procedure but starting with 9α-bromo-11β,17α,21-trihydroxy-6,16α-dimethyl-4,6-pregnadiene-3,20-dione 21 acetate there are obtained 9α-bromo-11β,17α,21-trihydroxy-6,16α-dimethyl-1,4,6-pregnatriene-3,20-dione and its 21-acetate.

In accordance with the above procedure but starting with 9α-fluoro-11β,17α,21-trihydroxy-6,16β-dimethyl-4,6-pregnadiene-3,20-dione 21-acetate there are obtained 9α-fluoro - 11,β,17α,21 - trihydroxy - 6,16β - dimethyl - 1,4,6-pregnatriene-3,20-dione and its 21-acetate.

In accordance with the above procedure but starting with 9α-chloro-11β,17α,21-trihydroxy - 6,16β - dimethyl-4,6-pregnadiene-3,20-dione 21-acetate there are obtained 9α - chloro - 11β,17α,21 - trihydroxy - 6,16β - dimethyl-1,4,6-pregnatriene-3,20-dione and its 21-acetate.

In accordance with the above procedure but starting with 9α-bromo-11β,17α,21-trihydroxy-6,16β-dimethyl-4,6-pregnadiene-3,20-dione 21-acetate there are obtained 9α-bromo - 11β,17α,21 - trihydroxy - 6,16β - dimethyl-1,4,6-pregnatriene-3,20-dione and its 21-acetate.

To a solution of 200 mg. of 9α-fluoro-17α,21-dihydroxy-6,16α-dimethyl-4,6-pregnadiene-3,11,20-trione 21 - acetate in 0.16 ml. of acetic acid and 12 ml. of t-amyl alcohol is added 120 mg. of selenium dioxide and 2 drops of mercury. The mixture is refluxed under nitrogen overnight. The solution is filtered, washed with soduim bicarbonate, dried, and concentrated. This product is chromatographed on acid-washed alumina. The adsorbate is eluted with mixtures of chloroform and ether, increasingly rich in chloroform. The eluates are combined, evaporated to dryness and the residual material recrystallized from ethyl acetate to give 9α-fluoro-17α,21-dihydroxy-6,16α-dimethyl-1,4,6-pregnatriene-3,11,20-trione 21-acetate. This product is then hydrolyzed by treatment with a solution of potassium bicarbonate in aqueous methanol to form 9α-fluoro - 17α,21 - dihydroxy - 6,16α - dimethyl - 1,4,6-pregnatriene-3,11,20-trione.

In accordance with the above procedure but starting with 9α-chloro-17α,21-dihydroxy-6,16α-dimethyl-4,6-pregnadiene-3,11,20-trione 21-acetate there are obtained 9α-chloro - 17α,21 - dihydroxy - 6,16α - dimethyl - 1,4,6-pregnatriene-3,11,20-trione and its 21-acetate.

Similarly, in accordance with the above procedure but starting with 9α-bromo-17α,21-dihydroxy-6,16α-dimethyl-4,6-pregnadiene-3,11,20-trione 21-acetate there are obtained 9α-bromo-17α,21-dihydroxy-6,16α-dimethyl-1,4,6-pregnatriene-3,11,20-trione and its 21-acetate.

In accordance with the above procedure but starting with 9α-fluoro-17α,21-dihydroxy-6,16β-dimethyl-4,6-pregnadiene-3,11,20-trione 21-acetate there are obtained 9α-fluoro - 17α,21 - dihydroxy - 6,16β - dimethyl - 1,4,6-pregnatriene-3,11,20-trione and its 21-acetate.

In accordance with the above procedure but starting with 9α-chloro-17α,21-dihydroxy-6,16β-dimethyl-4,6-pregnadiene-3,11,20-trione 21-acetate there are obtained 9α-chloro - 17α,21 - dihydroxy -6,16β - dimethyl - 1,4,6-pregnatriene-3,11,20-trione and its 21-acetate.

In accordance with the above procedure but starting with 9α-bromo-17α,21-dihydroxy-6,16β-dimethyl-4,6-pregnadiene-3,11,20-trione 21-acetate there are obtained 9α-bromo - 17α,21 - dihydroxy - 6,16β - dimethyl - 1,4,6-pregnatriene-3,11,20-trione and its 21-acetate.

To a suspension of 25.0 g. of 11β,17α,21-trihydroxy-6,16α-dimethyl-4,6-pregnadiene-3,20-dione in 1.5 l. of alcohol-free chloroform cooled to about 5° C. in an ice bath is added with constant stirring 750 ml. of cold, concentrated aqueous hydrochloric acid solution and then 750 ml. of formalin (low in methanol). The mixture is removed from the ice bath and stirred at room temperature for approximately 7 hours. The layers are separated and the aqueous phase is back-extracted twice with chloroform. The combined chloroform layers are washed twice with a 5% aqueous solution of sodium bicarbonate, and twice with a saturated aqueous solution of sodium chloride. The washed chloroform solution is dried over magnesium sulfate and evaporated under reduced pressure. The residual material is triturated with methanol to give a crystalline solid, which is recrystallized from a mixture of benzene and n-hexane to give 17α,20,20,21-bismethylenedioxy-11β, hydroxy-6,16α-dimethyl-4,6-pregnadiene-3-one.

A solution of 400 mg. of 17α,20,20,21-bismethylenedioxy-11β-hydroxy-6,16α-dimethyl-4,6-pregnadiene-3-one in 4 ml. of pyridine is added to the complex formed by the addition of 400 mg. of chromium trioxide to 4 ml. of pyridine. The mixture is swirled until thoroughly mixed and then allowed to stand at room temperature for a period of about 15 hours. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give 17α,20,-20,21-bismethylenedioxy-6,16α-dimethyl-4,6-pregnadiene-3,11-dione.

Approximately 1.35 g. of 17α,20,20,21-bismethylenedioxy - 6,16α - dimethyl - 4,6 - pregnadiene - 3,11 - dione is dissolved in 23 ml. of dry, hot benzene, the resulting solution is cooled to room temperature, and to the solution is added 0.96 ml. of freshly-distilled ethyl formate. The air in the system is replaced with nitrogen and 560 mg. of sodium hydride (as a 58% dispersion in mineral oil) is added. The system is again evacuated and filled with nitrogen, and the mixture is stirred at room temperature for a period of about 15 hours. The reaction mixture is poured into an excess of a saturated aqueous solution of sodium dihydrogen phosphate, and the resulting aqueous mixture is extracted four times with benzene. The benzene reaction solution and extracts are combined, washed three times with water, dried over sodium sulfate, and evaporated to dryness. The residual material is dissolved in ether, and the ether solution is extracted with a 10% aqueous solution of sodium carbonate. The aqueous alkaline extracts are acidified with an excess of a saturated aqueous solution of sodium dihydrogen phosphate, and the aqueous acidic mixture extracted with ether and then with chloroform. The combined organic extracts are dried over sodium sulfate, and evaporated to dryness to give $17\alpha,20,20,21$-bismethylenedioxy - 2 - hydroxy - methylene - $6,16\alpha$-dimethyl-4,6-pregnadiene-3,11-dione.

Approximately 850 mg. of $17\alpha,20,20,21$-bismethylenedioxy - 2 - hydroxymethylene - $6,16\alpha$ - dimethyl - 4,6-pregnadiene-3,11-dione is dissolved in 9.2 ml. of absolute ethanol, and to the solution is added a solution of 0.16 ml. of hydrazine hydrate dissolved in 0.16 ml. of absolute ethanol. The resulting mixture is heated under reflux in a nitrogen atmosphere for a period of about 45 minutes, and the reaction mixture is then evaporated to dryness under reduced pressure. The residual material is washed with three portions of cold water, and the resulting amorphous solid is dried at a temperature of about 80° C. for 1 hour in high vacuum to give $17\alpha,20,20,21$-bismethylenedioxy - $6,16\alpha$ - dimethyl - [3,2 - c]pyrazolo - 4,6 - pregnadiene-11-one.

To a solution of 100 mg. of $17\alpha,20,20,21$-bismethylenedioxy - $6,16\alpha$ - dimethyl - [3,2 - c]pyrazolo - 4,6 - pregnadiene-11-one in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, with ice-cold 1 N sulfuric acid (until the pH of the aqueous layer is 1–3), with saturated aqueous sodium bicarbonate solution (until the pH of the aqueous layer is 8), and with water (until the aqueous layer is neutral). The ethyl acetate solution is then dried with anhydrous sodium sulfate, and the solvent is distilled at a temperature of about 40° C., in vacuo to give 1' - acetyl - $17\alpha,20,20,21$ - bismethylenedioxy - $6,16\alpha$-dimethyl - [3,2 - c]pyrazolo - 4,6 - pregnadiene - 11 - one, which is isolated by the addition of water and filtration.

In accordance with the above procedure, but using an equivalent quantity of another acylating agent in place of the acetic anhydride, there is obtained the corresponding 1'-acyl derivative.

Approximately 720 mg. of 1'-acetyl-$17\alpha,20,20,21$-bismethylenedioxy - $6,16\alpha$ - dimethyl - [3,2 - c]pyrazolo-4,6-pregnadiene-11-one is heated on a steam bath with 24 ml. of a 60% aqueous solution of formic acid for a period of about 30 minutes. The excess reagent is removed in vacuo using a water bath at a temperature of about 50° C. as the source of heat. The residual material is flushed four times with n-hexane, and dried at 60° C. in high vacuum. The amorphous solid thus obtained is dissolved in about 3.4 ml. of pure methanol and allowed to react with 1.3 ml. of a 1.33 N solution of sodium methoxide in methanol at room temperature under a nitrogen atmosphere for ten minutes. The excess sodium methoxide is neutralized with acetic acid, and the mixture is then evaporated to dryness and flushed with n-hexane. The residual material is washed with water, filtered and dried to give $17\alpha,21$-dihydroxy-$6,16\alpha$ - dimethyl-[3,2 - c]pyrazolo 4,6 - pregnadiene - 11,20-dione.

In accordance with the above procedures, but starting with the $11\beta,17\alpha,21$-trihydroxy-$6,16\beta$-dimethyl-4,6-pregnadiene-3,20-dione in place of the $11\beta,17\alpha,21$-trihydroxy-$6,16\alpha$ - dimethyl - 4,6 - pregnadiene - 3,20 - dione, there is obtained as product the corresponding $17\alpha,21$-dihydroxy - $6,16\beta$ - dimethyl - [3,2 - c]pyrazolo - 4,6 - pregnadiene-11,20-dione.

In accordance with the above procedures, but starting with $11\beta,17\alpha,21$ - trihydroxy - $6,16\alpha$ - dimethyl - $9\alpha$-fluoro-4,6-pregnadiene-3,20-dione in place of the $11\beta,17\alpha,$-21 - trihydroxy - $6,16\alpha$ - dimethyl - 4,6 - pregnadiene-3,20-dione, there is obtained as product, via the intermediate formation of 1'-acetyl-$17\alpha,20,20,21$-bismethylenedioxy - $6,16\alpha$ - dimethyl - $9\alpha$ - fluoro - [3,2 - c]pyrazolo-4,6-pregnadiene-11-one, the corresponding $17\alpha,21$-dihydroxy - $6,16\alpha$ - dimethyl - $9\alpha$ - fluoro - [3,2 - c]pyrazolo-4,6-pregandiene-11,20-dione. Alternatively, the intermediate 1' - acetyl - $17\alpha,20,20,21$ - bismethylenedioxy-$6,16\alpha$ - dimethyl - $9\alpha$ - fluoro - [3,2 - c]pyrazolo - 4,6-pregnadiene-11-one is reacted with sodium borohydride to form 1' - acetyl - $17\alpha,20,20,21$ - bismethylenedioxy - $6,16\alpha$-dimethyl - $9\alpha$ - fluoro - [3,2 - c]pyrazolo - 4,6 - pregnadiene-11$\beta$-ol which is then reacted with 60% aqueous formic acid and the resulting amorphous solid reacted with dilute methanolic sodium methoxide as described hereinabove in this example, thereby forming $11\beta,17\alpha,21$-trihydroxy - $6,16\alpha$ - dimethyl - $9\alpha$ - fluoro - [3,2 - c]pyrazolo-4,6-pregnadiene-20-one.

Approximately 1.35 g. of $17\alpha,20,20,21$-bismethylenedioxy-11$\beta$-hydroxy-$6,16\alpha$-dimethyl - 4,6 - pregnadiene-3-one (which can be prepared as described hereinabove in this example) is dissolved in 23 ml. of dry, hot benzene, the resulting solution is cooled to room temperature, and to the solution is added 0.96 ml. of freshly-distilled ethyl formate. The air in the system is replaced with nitrogen and 560 mg. of sodium hydride (as a 58% dispersion in mineral oil) is added. The system is again evacuated and filled with nitrogen, and the mixture is stirred at room temperature for a period of about 15 hours. The mixture is poured into an excess of a saturated aqueous solution of sodium dihydrogen phosphate, and the resulting aqueous mixture is extracted four times with benzene. The benzene reaction solution and extracts are combined, washed three times with water, dried over sodium sulfate, and evaporated to dryness. The residual material is dissolved in ether, and the ether solution is extracted with a 10% aqueous solution of sodium carbonate. The aqueous alkaline extracts are acidified with an excess of a saturated aqueous solution of sodium dihydrogen phosphate, and the aqueous acidic mixture extracted with ether and then with chloroform. The combined organic extracts are dried over sodium sulfate, and evaporated to dryness to give $17\alpha,20,20,21$-bismethylenedioxy-11$\beta$-hydroxy-2-hydroxymethylene-$6,16\alpha$-dimethyl-4,6-pregnadiene-3-one.

Approximately 850 mg. of $17\alpha 20,20,21$-bismethylenedioxy-11$\beta$-hydroxy - 2 - hydroxymethylene-$6,16\alpha$-dimethyl-4,6-pregnadiene-3-one is dissolved in 9.2 ml. of absolute ethanol, and to the solution is added a solution of 0.16 ml. of hydrazine hydrate dissolved in 0.16 ml. of absolute ethanol. The resulting mixture is heated under reflux in a nitrogen atmosphere for a period of about 45 minutes, and the reaction mixture is then evaporated to dryness under reduced pressure. The residual material is washed with three portions of cold water, and the resulting amorphous solid is dried at a temperature of about 80° C. for 1 hour in high vacuum to give $17\alpha,20,20,21$-bismethylenedioxy - $6,16\alpha$-dimethyl-[3,2-c]pyrazolo-4,6-pregnadiene-11$\beta$-ol.

To a solution of 100 mg. of $17\alpha,20,20,21$-bismethylenedioxy-$6,16\alpha$-dimethyl-[3,2-c]pyrazolo - 4,6 - pregnadiene-11$\beta$-ol in 2 ml. of pyridine is added 0.5 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, with ice-cold 1 N sulfuric acid (until the pH of the aqueous layer is 1–3), with saturated aqueous sodium bicarbonate solution (until the pH of the aqueous layer is 8), and with water (until the aqueous layer is neutral). The ethyl acetate solution is then dried with anhydrous sodium sulfate, and the solvent is distilled at a temperature of about 40° C. in vacuo to give 1'-acetyl-17α,20,20,21-bismethylenedioxy-6-16α-dimethyl-[3,2-c]pyrazolo - 4,6 - pregnadiene-11β-ol which is isolated by the addition of water and filtration.

In accordance with the above procedure, but using an equivalent quantity of another acylating agent in place of acetic anhydride there is obtained the corresponding 1'-acyl-steroid.

Approximately 720 mg. of 1'-acetyl-17α,20,20,21-bismethylenedioxy - 6,16α - dimethyl - [3,2-c]pyrazolo-4,6-pregnadiene-11β-ol is heated on a steam bath with 24 ml. of a 60% aqueous solution of formic acid for a period of about 30 minutes. The excess reagent is removed in vacuo using a water bath at a temperature of about 50° C. as the source of heat. The residual material is flushed four times with n-hexane, and dried at 60° C. in high vacuum. The amorphous solid thus obtained is dissolved in about 3.4 ml. of pure methanol and allowed to react with 1.3 ml. of a 1.33 N solution of sodium methoxide in methanol at room temperature under a nitrogen atmosphere for ten minutes. The excess sodium methoxide is neutralized with acetic acid, and the mixture is then evaporated to dryness and flushed with n-hexane. The residual material is washed with water, filtered and dried to give 11β,17α,21 - trihydroxy - 6,16α-dimethyl-[3,2-c]pyrazolo-4,6-pregnadiene-20-one.

Approximately 0.5 g. of 17α,20,20,21-bismethylenedioxy-11β-hydroxy-6,16α-dimethyl - 4,6 - pregnadiene-3-one is dissolved in 25 cc. of benzene, and about 5 cc. of benzene is removed from the solution by distillation at normal pressure. The resulting solution is cooled to room temperature, and to the solution is added about 0.75 cc. of freshly-distilled ethyl formate. The air in the system is replaced with nitrogen, and about 150 mg. of sodium hydride (as a 57% dispersion in mineral oil) is added. The mixture is stirred under nitrogen at room temperature for a period of about three hours. About 15 cc. of a saturated aqueous solution sodium dihydrogen phosphate is added to the reaction mixture and the resulting aqueous mixture is extracted with ether. The benzene solution and ether extracts are combined, extracted with 2 N aqueous sodium hydroxide, and the aqueous sodium hydroxide extracts are acidified with sodium dihydrogen phosphate. The aqueous acidified solution is extracted with ether, the ether extract is evaporated to dryness, and the residual material is crystallized from ether to give 17α,20,20,21-bismethylenedioxy-11β-formyloxy - 2 - hydroxymethylene-6,16α-dimethyl-4,6-pregnadiene-3-one. Evaporation of the ether mother liquor, followed by recrystallization of the residual material from ether gives substantially pure 17α,20,20,21-bismethylenedioxy - 11β - hydroxy - 2 - hydroxymethylene-6,16α-dimethyl-4,6-pregnadiene-3-one; M.P. 200–204° C.

Approximately 1.19 g. of 17α,20,20,21-bismethylenedioxy-11β-hydroxy-2-hydroxymethylene-6,16α - dimethyl-4,6-pregnadiene-3-one is dissolved in 25 cc. of ethanol. Three hundred mg. of phenyl hydrazine is added, and the mixture is heated under reflux in a nitrogen atmosphere for one hour. About 25 cc. of water is added. The product is then extracted into 150 cc. of ether. The ether extracts are washed with 2 N aqueous HCl, with saturated sodium bicarbonate, with water, with saturated aqueous sodium chloride solution, and then dried over anhydrous sodium sulfate. The washed and dried ether extracts are evaporated to dryness and the residual material is crystallized from ether to give 17α,20,20,21-bismethylenedioxy-6,16α-dimethyl-2'-phenyl-[3,2-c]pyrazolo - 4,6 - pregnadiene-11β-ol; M.P. 258–262° C.

Approximately 430 mg. of 17α,20,20,21-bismethylenedioxy - 6,16α - dimethyl-2'-phenyl-[3,2-c]pyrazolo-4,6-pregnadiene-11β-ol is heated on a steam bath under nitrogen with 40 cc. of a 60% aqueous solution of formic acid for a period of about 30 minutes. About 40 cc. of water is added to the reaction mixture, and the mixture is then extracted into about 200 cc. of chloroform. The chloroform solution is washed with water, with saturated aqueous sodium bicarbonate solution, again with water, and is then dried over anhydrous sodium sulfate. The washed and dried chloroform solution is evaporated under vacuum and the residual product is dissolved in 60 cc. of absolute methanol, and 0.1 equivalent of sodium methoxide in methanol is added. The resulting mixture is stirred under nitrogen at room temperature for 15 minutes. The reaction mixture is acidified with acetic acid, and the solvent is evaporated under vacuum at room temperature. About 20 cc. of water is added to the residual material, and the aqueous mixture is extracted with about 150 cc. of ethyl acetate. The ethyl acetate solution is washed with saturated aqueous sodium bicarbonate solution, with water, and is then dried over anhydrous sodium sulfate and evaporated to dryness to give an amorphous solid. This amorphous solid is dried in a high vacuum, and is then dissolved in 4 cc. of pyridine. About 3 cc. of acetic anhydride is added. The resulting mixture is heated on the steam bath for about 15 minutes and evaporated to dryness in vacuo. About 20 cc. of water is added. The aqueous mixture is then extracted with about 150 cc. of ethyl acetate, the ethyl acetate extract is washed with saturated aqueous sodium bicarbonate solution, and with water; and is then dried over anhydrous sodium sulfate. The washed and dried ethyl acetate solution is evaporated in vacuo, and the residual material is crystallized from ethyl acetate-benzene to give substantially pure 11β,17α,21-trihydroxy-6,16α-dimethyl-2'-phenyl-[3,2-c]pyrazolo-4,6-pregnadiene-20-one 21-acetate; M.P. 225–226° C.

One hundred mg. of 11β,17α,21-trihydroxy-6,16α-dimethyl-2'-phenyl-[3,2-c]pyrazolo - 4,6 - pregnadiene-20-one 21-acetate is dissolved in 10 cc. of absolute methanol, and 1.1 equivalents of sodium methoxide in methanol is added. The mixture is stirred at room temperature under nitrogen for 15 minutes. The product is acidified with acetic acid and is then evaporated at room temperature under vacuum. The residual material is dissolved in 100 cc. of chloroform, the chlorofrom solution is washed with water, with saturated aqueous sodium bicarbonate solution, again with water, and is then dried over anhydrous sodium sulfate. The washed and dried chloroform solution is evaporated to dryness to give 11β,17α,21-trihydroxy - 6,16α - dimethyl-2'-phenyl-[3,2-c]pyrazolo-4,6-pregnadiene-20-one.

The 16-mono-N-acetylamido-2-deoxy-glucosides and galactosides of this invention are prepared from the corresponding 16-hydroxy-21-acylates such as the 21-acetate. The monoacetate is prepared as follows: a mixture of the 16,21-diacetate and the 21-monoacetate prepared by treating the steroid substrate, for example, 9α-fluoro-11β,16α,17α,21-tetrahydroxy-1,4-pregnadiene-3,20-dione with 1.1 to 1.2 molar equivalents of acetic anhydride in pyridine is extracted with an excess of 0.1 M aqueous sodium tetraborate. The diacetate is insoluble. The 21-monoacetate dissolves in the alkaline solution and precipitates on standing at room temperature after adjusting the pH to 1.2–2.0 with concentrated hydrochloric acid.

What is claimed is:

1. 11β,17α - dihydroxy - 3,20 - dione - 1,4 - pregnadiene - 21 - yl - tri - O - acetyl - β - D - 2' - acetamido-2'-deoxy-glucoside.

2. 16α - methyl - 11β,17α - dihydroxy - 3,20 - dione-1,4 - pregnadiene - 21 - yl - tri - O - acetyl - β - D - 2'-acetamido-2'-deoxy-glucoside.

3. 9α - fluoro - 6α,16α - dimethyl - 11β,17α - dihydroxy - 3,20 - dione - 1,4 - pregnadiene - 21 - yl - tri - O-acetyl-β-D-2′-acetamido-2′-deoxy-glucoside.

4. 9α - fluoro - 16β - methyl - 11β,17α - dihydroxy- 3,20 - dione - 1,4 - pregnadiene - 21 - yl - tri - O - acetyl-β-D-2′-acetamido-2′-deoxy-glucoside.

5. 6α - methyl - 11β,17α - dihydroxy - 3,20 - dione- 1,4 - pregnadiene - 21 - yl - tri - O - acetyl - β - D - 2′-acetamido-2′-deoxy-glucoside.

6. 6α - fluoro - 11β,17α - dihydroxy - 3,20 - dione - 1,4-pregnadiene - 21 - yl - tri - O - acetyl - β - D - 2′ - acetamido-2′-deoxy-glucoside.

7. 6,16α - dimethyl - 11β,17α - dihydroxy - 3,20-dione- 4,6 - pregnadiene - 21 - yl - tri - O - acetyl - β - D - 2′-acetamido-2′-deoxy-glucoside.

8. A compound selected from the group consisting of 9α - fluoro - 11β,16α,17α - trihydroxy - 3,20 - dione - 1,4-pragnadiene - 21 - yl - tri - O - acetyl - β - D - 2′ - acetamido-2′-deoxy-glucoside and the 16,17-acetonide thereof.

9. 6,16α - dimethyl - 11β,17α - dihydroxy - [3,2 - c]pyrazolo - 4,6 - pregnadiene - 20 - one - 21 - yl - tri - O-acetyl-β-D-2′-acetamido-2′-deoxy-glucoside.

10. 11β,17α - dihydroxy - 2′ - phenyl - [3,2 - c]pyrazolo - 4 - pregnene - 20 - one - 21 - 21 - yl - tri - O - acetyl-β-D-2′-acetamido-2′-deoxy-glucoside.

11. 9α - fluoro - 21 - acetoxy - 11β,17α - dihydroxy- 3,20 - dione - 4 - pregnene - 16α - yl - tri - O - acetyl - β-D-2′-acetamido-2′-deoxy-glucoside.

12. 9α - fluoro - 21 - acetoxy - 11β,17α - dihydroxy- 3,20 - dione - 1,4 - pregnadiene - 16α - yl - tri - O - acetyl-β-D-2′-acetamido-2′-deoxy-glucoside.

No references cited.

LEWIS GOTTS, *Primary Examiner.*
JONNIE R. BROWN, *Assistant Examiner.*